(12) United States Patent
Toothaker et al.

(10) Patent No.: US 12,151,372 B2
(45) Date of Patent: Nov. 26, 2024

(54) SYSTEMS AND METHODS FOR HOSE ROUTING IN PROGRAMMABLE MOTION SYSTEMS

(71) Applicant: Berkshire Grey Operating Company, Inc., Bedford, MA (US)

(72) Inventors: Calvin Toothaker, Medford, MA (US); Alexander Paxson, Acton, MA (US); Victoria Hinchey, Winchester, MA (US); John Richard Amend, Jr., Belmont, MA (US); Benjamin Cohen, Somerville, MA (US); Christopher Geyer, Arlington, MA (US); Matthew T. Mason, Pittsburgh, PA (US); Thomas Wagner, Concord, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 711 days.

(21) Appl. No.: 16/802,810

(22) Filed: Feb. 27, 2020

(65) Prior Publication Data
US 2020/0269416 A1 Aug. 27, 2020

Related U.S. Application Data

(60) Provisional application No. 62/811,291, filed on Feb. 27, 2019.

(51) Int. Cl.
*B25J 9/04* (2006.01)
*B25J 9/16* (2006.01)
(Continued)

(52) U.S. Cl.
CPC . *B25J 9/04* (2013.01); *B25J 9/16* (2013.01); *B25J 15/0616* (2013.01);
(Continued)

(58) Field of Classification Search
CPC ... B25J 9/04; B25J 9/16; B25J 15/0616; B25J 17/0258; B25J 19/0025
See application file for complete search history.

(56) References Cited

U.S. PATENT DOCUMENTS 4,754,663 A * 7/1988 Yasukawa ................ B25J 9/042
901/19
4,767,257 A * 8/1988 Kato .................... B25J 19/0025
285/190

(Continued)

FOREIGN PATENT DOCUMENTS

CA 2514204 A1 8/2004
CA 2928645 A1 4/2015
(Continued)

OTHER PUBLICATIONS

International Search Report and Written Opinion issued by the International Searching Authority in related International Application No. PCT/US2020/020046 on Jun. 23, 2020, 12 pages.

(Continued)

*Primary Examiner* — William C Joyce
(74) *Attorney, Agent, or Firm* — Gesmer Updegrove LLP

(57) ABSTRACT

A programmable motion robotic system is disclosed that includes a plurality of arm sections that are joined one to another at a plurality of joints to form an articulated arm; and a hose coupling an end effector of the programmable motion robotic system to a vacuum source, the hose being attached, in a joint portion of the hose, to at least two adjacent arm sections of the plurality of arm sections mutually attached to a joint of the plurality of joints such that the joint portion of the hose remains substantially outside of any plane defined by motion of the mutually adjacent arm sections when rotated about the joint.

27 Claims, 23 Drawing Sheets

(51) Int. Cl.
*B25J 15/06* (2006.01)
*B25J 17/02* (2006.01)
*B25J 19/00* (2006.01)
*B25J 18/00* (2006.01)

(52) U.S. Cl.
CPC ....... *B25J 17/0258* (2013.01); *B25J 19/0025* (2013.01); *B25J 18/00* (2013.01)

(56) References Cited

U.S. PATENT DOCUMENTS

| | | | |
|---|---|---|---|
| 4,873,511 A * | 10/1989 | Tanaka | B25J 19/0025 200/61.18 |
| 5,132,601 A * | 7/1992 | Ohtani | B25J 9/104 318/567 |
| 5,727,832 A | 3/1998 | Holter | |
| 6,131,973 A | 10/2000 | Trudeau et al. | |
| 6,181,983 B1 | 1/2001 | Schlemmer et al. | |
| 6,439,076 B1 * | 8/2002 | Flemmer | B25J 9/042 74/490.03 |
| 8,266,979 B2 * | 9/2012 | Yonehara | B25J 19/0029 901/23 |
| 8,534,633 B2 * | 9/2013 | Tell | B25J 15/0616 248/205.8 |
| 8,720,296 B2 * | 5/2014 | Yonehara | B25J 9/06 901/27 |
| 9,254,575 B2 * | 2/2016 | Murakami | B25J 19/0025 |
| 9,346,173 B2 * | 5/2016 | Asano | B25J 19/0029 |
| 9,393,703 B2 * | 7/2016 | Kume | B25J 19/0025 |
| 9,415,520 B2 * | 8/2016 | Sanders | B25J 17/0275 |
| 9,415,975 B2 | 8/2016 | Lundin | |
| 9,687,982 B1 | 6/2017 | Jules et al. | |
| 10,007,827 B2 | 6/2018 | Wagner et al. | |
| 10,335,956 B2 | 7/2019 | Wagner et al. | |
| 10,369,701 B1 | 8/2019 | Diankov et al. | |
| 10,438,034 B2 | 10/2019 | Wagner et al. | |
| 10,538,394 B2 | 1/2020 | Wagner et al. | |
| 10,576,621 B2 | 3/2020 | Wagner et al. | |
| 10,583,553 B2 | 3/2020 | Wagner et al. | |
| 10,596,696 B2 | 3/2020 | Wagner et al. | |
| 10,625,305 B2 | 4/2020 | Wagner et al. | |
| 10,625,432 B2 | 4/2020 | Wagner et al. | |
| 10,632,581 B2 * | 4/2020 | Takeda | B25J 9/0018 |
| 10,646,991 B2 | 5/2020 | Wagner et al. | |
| 10,649,445 B2 | 5/2020 | Wagner et al. | |
| 10,668,630 B2 | 6/2020 | Robinson et al. | |
| 10,843,333 B2 | 11/2020 | Wagner et al. | |
| 10,857,682 B2 | 12/2020 | Wagner et al. | |
| 10,906,188 B1 | 2/2021 | Sun et al. | |
| 10,913,614 B2 | 2/2021 | Wagner et al. | |
| 11,046,530 B2 | 6/2021 | Koga | |
| 11,055,504 B2 | 7/2021 | Wagner et al. | |
| 11,205,059 B2 | 12/2021 | Wagner et al. | |
| 2001/0052564 A1 | 12/2001 | Karlinger | |
| 2006/0064286 A1 | 3/2006 | Fink et al. | |
| 2006/0196300 A1 | 9/2006 | Kidooka et al. | |
| 2006/0242785 A1 | 11/2006 | Cawley et al. | |
| 2006/0247285 A1 | 11/2006 | Neogi et al. | |
| 2007/0005179 A1 | 1/2007 | Mccrackin et al. | |
| 2010/0040450 A1 | 2/2010 | Parnell | |
| 2010/0122451 A1 | 5/2010 | Yang et al. | |
| 2011/0243707 A1 | 10/2011 | Dumas et al. | |
| 2011/0255948 A1 | 10/2011 | Malinowski | |
| 2012/0025053 A1 | 2/2012 | Tell | |
| 2013/0110280 A1 | 5/2013 | Folk | |
| 2013/0147101 A1 | 6/2013 | Cho | |
| 2013/0218335 A1 | 8/2013 | Barajas et al. | |
| 2013/0232919 A1 | 9/2013 | Jaconelli | |
| 2014/0154036 A1 | 6/2014 | Mattern et al. | |
| 2014/0195095 A1 | 7/2014 | Flohr et al. | |
| 2014/0244026 A1 | 8/2014 | Neiser | |
| 2015/0100194 A1 | 4/2015 | Terada | |
| 2015/0294044 A1 | 10/2015 | Schaer | |
| 2015/0298316 A1 | 10/2015 | Accou et al. | |
| 2015/0306770 A1 | 10/2015 | Mittal et al. | |
| 2015/0355639 A1 | 12/2015 | Versteeg et al. | |
| 2016/0075537 A1 | 3/2016 | Lundin | |
| 2016/0101526 A1 | 4/2016 | Saito et al. | |
| 2016/0176043 A1 | 6/2016 | Mishra et al. | |
| 2016/0205816 A1 | 7/2016 | Inoue et al. | |
| 2016/0243704 A1 | 8/2016 | Vakanski et al. | |
| 2016/0347545 A1 | 12/2016 | Lindbo et al. | |
| 2016/0347555 A1 | 12/2016 | Yohe et al. | |
| 2017/0062263 A1 | 3/2017 | Kesil et al. | |
| 2017/0087731 A1 | 3/2017 | Wagner et al. | |
| 2017/0121113 A1 | 5/2017 | Wagner et al. | |
| 2017/0136632 A1 | 5/2017 | Wagner et al. | |
| 2017/0157648 A1 | 6/2017 | Wagner et al. | |
| 2017/0197316 A1 | 7/2017 | Wagner et al. | |
| 2017/0225330 A1 | 8/2017 | Wagner et al. | |
| 2018/0057264 A1 | 3/2018 | Wicks et al. | |
| 2018/0265298 A1 | 9/2018 | Wagner et al. | |
| 2018/0265311 A1 | 9/2018 | Wagner et al. | |
| 2018/0273295 A1 | 9/2018 | Wagner et al. | |
| 2018/0273296 A1 | 9/2018 | Wagner et al. | |
| 2018/0273297 A1 | 9/2018 | Wagner et al. | |
| 2018/0273298 A1 | 9/2018 | Wagner et al. | |
| 2018/0281202 A1 | 10/2018 | Brudniok et al. | |
| 2018/0282065 A1 | 10/2018 | Wagner et al. | |
| 2018/0282066 A1 | 10/2018 | Wagner et al. | |
| 2018/0312336 A1 | 11/2018 | Wagner et al. | |
| 2018/0321692 A1 | 11/2018 | Castillo-Effen et al. | |
| 2018/0330134 A1 | 11/2018 | Wagner et al. | |
| 2018/0333749 A1 | 11/2018 | Wagner et al. | |
| 2018/0354717 A1 | 12/2018 | Lindbo et al. | |
| 2019/0015989 A1 | 1/2019 | Inazumi et al. | |
| 2019/0053774 A1 | 2/2019 | Weingarten | |
| 2019/0061174 A1 | 2/2019 | Robinson et al. | |
| 2019/0070734 A1 | 3/2019 | Wertenberger et al. | |
| 2019/0102965 A1 | 4/2019 | Greyshock et al. | |
| 2019/0127147 A1 | 5/2019 | Wagner et al. | |
| 2019/0152071 A1 * | 5/2019 | Deister | B25J 9/04 |
| 2019/0185267 A1 | 6/2019 | Mattern et al. | |
| 2019/0217471 A1 | 7/2019 | Romano et al. | |
| 2019/0270197 A1 | 9/2019 | Wagner et al. | |
| 2019/0270537 A1 | 9/2019 | Amend, Jr. et al. | |
| 2019/0315579 A1 | 10/2019 | He | |
| 2019/0329979 A1 | 10/2019 | Wicks et al. | |
| 2019/0337723 A1 | 11/2019 | Wagner et al. | |
| 2019/0344447 A1 | 11/2019 | Wicks et al. | |
| 2019/0361672 A1 | 11/2019 | Odhner et al. | |
| 2020/0005005 A1 | 1/2020 | Wagner et al. | |
| 2020/0016746 A1 | 1/2020 | Yap et al. | |
| 2020/0017314 A1 | 1/2020 | Rose et al. | |
| 2020/0130935 A1 | 4/2020 | Wagner et al. | |
| 2020/0139553 A1 | 5/2020 | Dainkov et al. | |
| 2020/0143127 A1 | 5/2020 | Wagner et al. | |
| 2020/0164517 A1 | 5/2020 | Dick et al. | |
| 2020/0189105 A1 | 6/2020 | Wen et al. | |
| 2020/0223058 A1 | 7/2020 | Wagner et al. | |
| 2020/0223634 A1 | 7/2020 | Arase et al. | |
| 2020/0269416 A1 | 8/2020 | Toothaker et al. | |
| 2020/0306977 A1 | 10/2020 | Islam et al. | |
| 2020/0316780 A1 | 10/2020 | Rostrup et al. | |
| 2020/0338728 A1 | 10/2020 | Toothaker et al. | |
| 2020/0346790 A1 | 11/2020 | Prakken et al. | |
| 2020/0376662 A1 | 12/2020 | Arase et al. | |
| 2021/0039140 A1 | 2/2021 | Geyer et al. | |
| 2021/0039268 A1 | 2/2021 | Anderson | |
| 2021/0053216 A1 | 2/2021 | Dainkov et al. | |
| 2021/0053230 A1 | 2/2021 | Mizoguchi et al. | |
| 2021/0094187 A1 | 4/2021 | Kanemoto et al. | |
| 2021/0114222 A1 | 4/2021 | Islam et al. | |
| 2021/0129971 A1 | 5/2021 | Brown, Jr. et al. | |
| 2021/0260762 A1 | 8/2021 | Arase et al. | |
| 2021/0260771 A1 | 8/2021 | Dainkov et al. | |
| 2021/0260775 A1 | 8/2021 | Mizoguchi | |
| 2021/0308879 A1 | 10/2021 | Mizoguchi et al. | |
| 2021/0323157 A1 | 10/2021 | Usui et al. | |
| 2022/0135347 A1 | 5/2022 | Cohen et al. | |
| 2022/0184822 A1 | 6/2022 | Hitz | |
| 2023/0278206 A1 | 9/2023 | Toothaker et al. | |

(56) References Cited

U.S. PATENT DOCUMENTS

FOREIGN PATENT DOCUMENTS

| | | |
|---|---|---|
| CA | 3043018 A1 | 5/2018 |
| CA | 3057334 A1 | 9/2018 |
| CN | 102896641 A | 1/2013 |
| CN | 103648730 A | 3/2014 |
| CN | 104870147 A | 8/2015 |
| CN | 105788739 A | 7/2016 |
| CN | 113396035 A | 9/2021 |
| CN | 113748000 A | 12/2021 |
| DE | 20203095 U1 | 9/2002 |
| DE | 102007008985 A1 | 8/2008 |
| DE | 202010007251 U1 | 10/2010 |
| EP | 0317020 A2 | 5/1989 |
| EP | 1661671 A1 | 5/2006 |
| EP | 2551068 A1 | 1/2013 |
| JP | S60259397 A | 12/1984 |
| JP | S61257789 A | 11/1986 |
| JP | 4-60692 * | 5/1992 |
| JP | H0460692 U | 5/1992 |
| JP | H07112379 A | 5/1995 |
| JP | 8-112797 * | 5/1996 |
| WO | 2006065147 A1 | 6/2006 |
| WO | 2008059457 A1 | 5/2008 |
| WO | 2014130937 A1 | 8/2014 |
| WO | 2014166650 A1 | 10/2014 |
| WO | 2015118171 A1 | 8/2015 |
| WO | 2015162390 A1 | 10/2015 |
| WO | 2019169418 A2 | 9/2019 |
| WO | 2019230893 A1 | 12/2019 |
| WO | 2020040103 A1 | 2/2020 |
| WO | 2020176708 A1 | 9/2020 |
| WO | 2020201031 A1 | 10/2020 |
| WO | 2020219480 A1 | 10/2020 |

OTHER PUBLICATIONS

Communication pursuant to Rules 161(1) and 162 EPC issued by the European Patent Office in related European Patent Application No. 20715562.3 on Oct. 5, 2021, 3 pages.

International Preliminary Report on Patentability issued by the International Bureau of WPO in related International Application No. PCT/US2020/020046 on Aug. 25, 2021, 8 pages.

Examiner's Report issued by the Innovation, Sciences and Economic Development Canada (Canadian Intellectual Property Office) in related Canadian Patent Application No. 3,131,913 on Dec. 5, 2022, 3 pages.

Notice on the First Office Action, along with its English translation, issued by the China National Intellectual Property Administration in related Chinese Patent Application No. 202080012850.7 on Mar. 24, 2023, 29 pages.

Anver Corporation, "Vacuum Tube Lifting Systems," Nov. 22, 2004 (http://www.jrgindustries.com/assets/anver.pdf).

Communication pursuant to Rules 161(1) and 162EPC issued by the European Patent Office in related European Patent Application No. 20725323.8 on Dec. 3, 2021, 3 pages.

Examiner's Report issued by the Innovation, Science and Economic Development Canada (Canadian Intellectual Property Office) in related Canadian Patent Application No. 3,136,859 on Jan. 30, 2023, 4 pages.

International Search Report and Written Opinion of the International Searching Authority issued in related International Application No. PCT/US2020/029200 on Aug. 11, 2020, 11 pages.

Middelplaats L N M, Mechanical Engineering, Automatic Extrinsic Calibration and Workspace Mapping Algorithms to Shorten the Setup time of Camera-guided Industrial Robots, Master of Science Thesis for the degree of Master of Science in BioMechanical Engineering at Delft University of Technology, Jun. 11, 2014, pp. 1-144, XP055802468, retrieved from the Internet: URL:http://resolver.tudelft.nl/uuid:0e51ad3e-a-2384d27-b53e-d76788f0ad26 [retrieved on May 7, 2021] the whole document.

Non-Final Office Action issued by the United States Patent and Trademark Office in related U.S. Appl. No. 16/855,015 on Jun. 16, 2022, 38 pages.

Notice on the First Office Action, along with its English translation, issued by the China National Intellectual Property Administration in related Chinese Patent Application No. 202080029110.4 on Mar. 31, 2023, 23 pages.

Notice on the Second Office Action, along with its English translation, issued by the China National Intellectual Property Administration in related Chinese Patent Application No. 202080012850.7 on Aug. 19, 2023, 28 pages.

Notice on the Second Office Action, along with its English translation, issued by the China National Intellectual Property Administration in related Chinese Patent Application No. 202080029110.4 on Oct. 19, 2023, 6 pages.

Notification Concerning Transmittal of International Preliminary Report on Patentability and the International Preliminary Report on Patentability issued by the International Bureau of WIPO in related International Application No. PCT/US202/029200 on Nov. 4, 2021, 8 pages.

Decision on Rejection issued by the China National Intellectual Property Administration in related Chinese Patent Application No. 202080012850.7 on Mar. 5, 2024, 28 pages.

Non-Final Office Action issued by the United States Patent and Trademark Office in related U.S. Appl. No. 18/197,298 on Mar. 21, 2024, 34 pages.

Notice of Allowance and Fee(s) Due issued by the United States Patent and Trademark Office in related U.S. Appl. No. 18/197,298 on Aug. 26, 2024, 9 pages.

* cited by examiner

SYSTEMS AND METHODS FOR HOSE ROUTING IN PROGRAMMABLE MOTION SYSTEMS

PRIORITY

The present application claims priority to U.S. Provisional Patent Application Ser. No. 62/811,291 filed Feb. 27, 2019, the disclosure of which is hereby incorporated by reference in its entirety.

BACKGROUND

The invention generally relates to programmable motion systems, and relates in particular to robotic systems, such as robotic pick-and-place systems whose task is to move objects from one location to another. The application for such systems could include any kind of material handling system that might benefit from automation, including automated package handling, automated order fulfillment, or automated store stock replenishment.

Some such robotic pick-and-place systems may employ vacuum gripping to pick items. Many common vacuum systems generate a vacuum at the end effector using a Venturi pump, which involves providing high pressure (e.g., 80 psi) air blown over an aperture to generate a vacuum at the aperture, and which vacuum is used for picking up objects, such as products, packages, boxes, shipping bags, etc. These systems require a low enough quantity of air that a small diameter (e.g., less than ¼") hose can be used to supply the high-pressure air at the end-effector. Such small diameter hoses are flexible enough, e.g., have a small enough bending radius, that they may be easily routed to the end-effector in a way that accommodates the motion of the robot e.g., an articulated arm in a large workspace. In such systems, the routing of the hose, for example, typically follows the contours of the articulated arm, bending or rotating with each joint of the articulated arm.

On the other hand, some robotic pick-and-place systems have been designed to grip items where leaks cannot be prevented. In order to sustain a vacuum, the system needs to compensate for the air loss from leaks. Such systems therefore must be able to pull a large amount of air through the vacuum gripper compared with the aforementioned Venturi pump-generated vacuum approach. These higher flow vacuum sources cannot typically be generated at the end-effector, and instead are often generated by a stationary blower placed near the robot. In such systems, however, instead of having a small amount of high-pressure air being pushed to the end-effector through a small diameter hose, significantly more air is pulled from the end-effector by a lower pressure vacuum through a much larger diameter hose. Because friction in the hose increases with the square of the air speed, the higher air flow necessitates a larger diameter hose. Doubling the hose diameter halves the required air speed for the same volumetric air flow, thus larger diameter hoses reduce friction and losses.

Larger diameter hoses, however, are problematic. Larger diameter hoses are less flexible, they take up more space, and they are heavier, all of which makes it difficult to provide the robot with the freedom of movement within a large workspace. Larger hoses need to be rigid enough to withstand collapse under vacuum, yet pliable enough to provide enough flexibility to accommodate the movement of the robot arm in its workspace. Many such hoses are made of plastic and attain their limited flexibility by being designed in a helical lip configuration, where, for example, a continuous helical lip is provided along the length of the hose. FIG. 1, for example, shows two such hoses at 10 and 12. The hose 10 includes a helical lip 14, and may have an inner diameter $d_1$ of about 2 cm to about 4 cm. The hose 12 includes a helical lip 16, and may have an inner diameter $d_2$ of about 4 cm to about 8 cm.

Where a bend forms in the hose, the bend in the lip has some freedom of movement that gives the overall hose some bending compliance. The bend in the continuous lip, however, may fail under cyclic loading, e.g., if the hose is repeatedly bent beyond its intended bending radius, or if it is repeatedly bent and unbent over a relatively long period of time. A robotic pick-and-place system, for example, may undergo millions of back-and-forth movements per year, and a poorly designed air handling design that subjects a hose to millions of bends per year will cause the hose to fail.

FIGS. 2A-2D show a pair of adjacent arm sections 20, 22 of an articulated arm programmable motion system, where each arm section 20, 22 is connected to a joint 24 having an axis of rotation A about which the arm sections 20, 22 may be rotated with respect to each other as shown. In particular, FIGS. 2B, 2C and 2D show the arm sections 20, 22 rotated progressively further about joint 24. A section of the hose that is near the joint, referred to herein as a joint section of the hose 26, moves with the arms sections, but may become bound up against itself as shown at 28 in FIG. 2D when the arm sections are rotated very close to one another. With reference to FIGS. 3A and 3B, a hose section 36 mounted on the outside of a joint 34 as arm sections 30, 32 rotate, may even bind against the joint itself as shown in FIG. 3B. As the robot's arm bends at the joint, the hose bends in the same plane, the axis of rotation A (shown in FIGS. 2A-2D) being normal to the plane. In other words, as the robot's arm rotates about the axis A during a motion, the hose bends with it, causing significant changes in the bending of the hose. Further, as the joined sections rotate from an angle (e.g., 90 degrees) to vertical (e.g., 180), and then further to an opposite angle, the hose must accommodate the changes in angular positions. As mentioned above, such an operation may be repeated many millions of times, which will cause significant strain on common plastic hoses. Certain further types of hose routing systems involve having a mechanism for gathering or releasing a hose (e.g., slack) as the articulated arm extends or rotates.

The requirements for mobility and freedom of movement within the workspace are particularly challenging. In addition to needing the hose to bend, a robot that swings up to 360 degrees about its base will need the hose to twist. The end-effector often needs to attain a large number of possible orientations in certain applications, which means that the attachment from the end-effector to the hose needs to accommodate the multitude of directions in which the hose mount needs to point as the robot moves from one place to another, for example, picking up items in arbitrary orientations.

While cable routing schemes exist for numerous types of cables and are suitable for narrow hoses, none satisfies the needs of using a large diameter hosing system on a small scale robot. There remains a need therefore, for a hose routing scheme for large diameter hoses in programmable motion devices.

SUMMARY

In accordance with an aspect, the invention provides a programmable motion robotic system that includes a plurality of arm sections that are joined one to another at a plurality of joints to form an articulated arm; and a hose coupling an end effector of the programmable motion robotic system to a vacuum source, the hose being attached, in a joint portion of the hose, to at least two adjacent arm sections of the plurality of arm sections mutually attached to a joint of the plurality of joints such that the joint portion of the hose remains substantially outside of any plane defined by motion of the mutually adjacent arm sections when rotated about the joint.

In accordance with another aspect, the invention provides a programmable motion robotic system including a plurality of arm sections that are joined one to another at a plurality of joints to form an articulated arm; and a hose coupling an end effector of the programmable motion robotic system to a vacuum source, the hose being attached, in a joint portion of the hose, to at least two adjacent arm sections of the plurality of arm sections mutually attached to a joint of the plurality of joints such that the joint portion of the hose defines a plane that includes a direction that is generally parallel with an axis of rotation of the joint.

In accordance with a further aspect, the invention provides a programmable motion robotic system including a plurality of arm sections that are joined one to another at a plurality of joints to form an articulated arm; and a hose coupling an end effector of the programmable motion robotic system to a vacuum source, the hose being attached, in a joint portion of the hose, to at least two arm sections of the plurality of arm sections with a joint of the plurality of joints therebetween such that the joint portion of the hose defines a plane that includes a direction that is generally parallel with an axis of rotation of the joint.

In accordance with yet a further aspect, the invention provides a method of providing a high flow vacuum source to an end effector of a programmable motion robotic system, the method including providing a hose that couples the end effector to a vacuum source, said hose including a joint portion of the hose proximate a joint of the programmable motion robotic system; and rotating at least one arm section attached to the joint about an axis, wherein the joint portion of the hose defines a plane that includes a direction that is generally parallel with the axis of rotation of the joint.

BRIEF DESCRIPTION OF THE DRAWINGS

The following may be further understood with reference to the accompanying drawings in which.

The drawings are shown for illustrative purposes only.

DETAILED DESCRIPTION

In accordance with various embodiments, the invention provides a method of mounting a large diameter cabling or hose on a multi-link mechanical system that (1) minimizes changes to the bending of a hose during motion, and (2) minimizes the maximum bending of such a hose in potential robot configurations.

Figure 1:
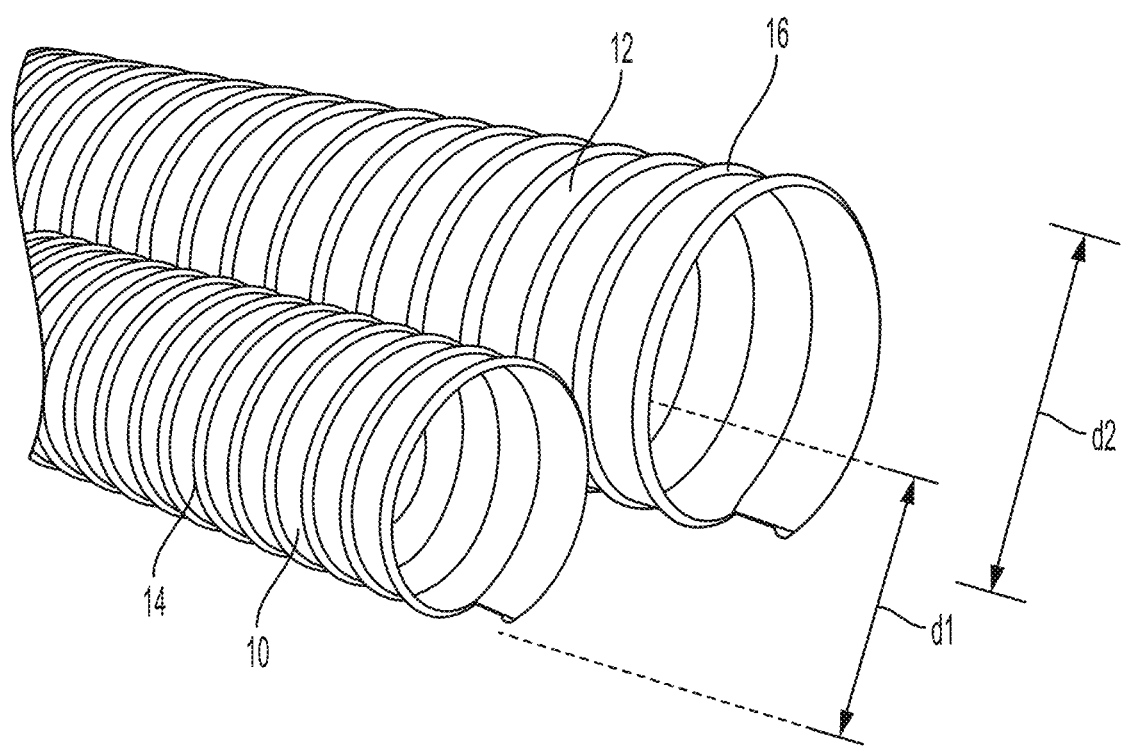
FIG. 1 shows an illustrative diagrammatic view of two large diameter vacuum hoses.
Figure 2B:
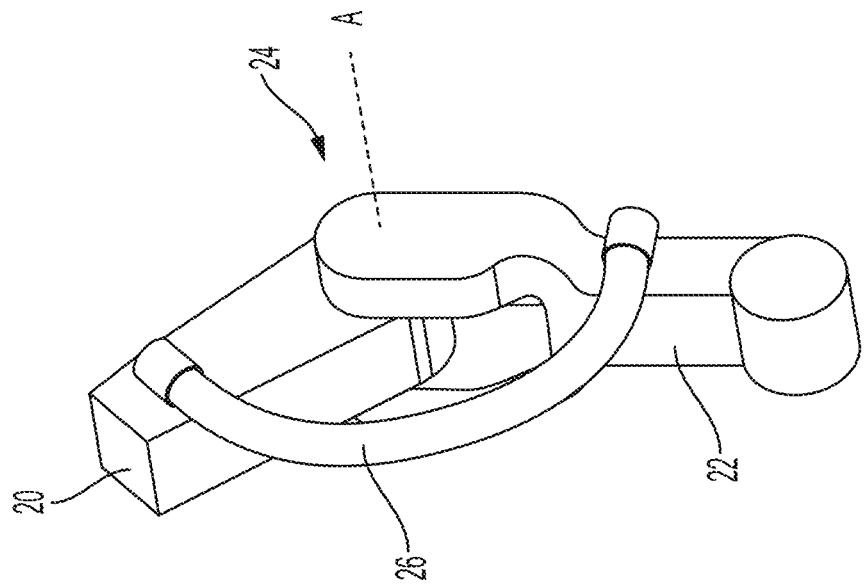
FIGS. 2A-2D show illustrative diagrammatic views of two arm sections of an articulated arm with a section of a hose attached to the arm sections of the prior art with the hose section inside of a bend joint.
Figure 2A:
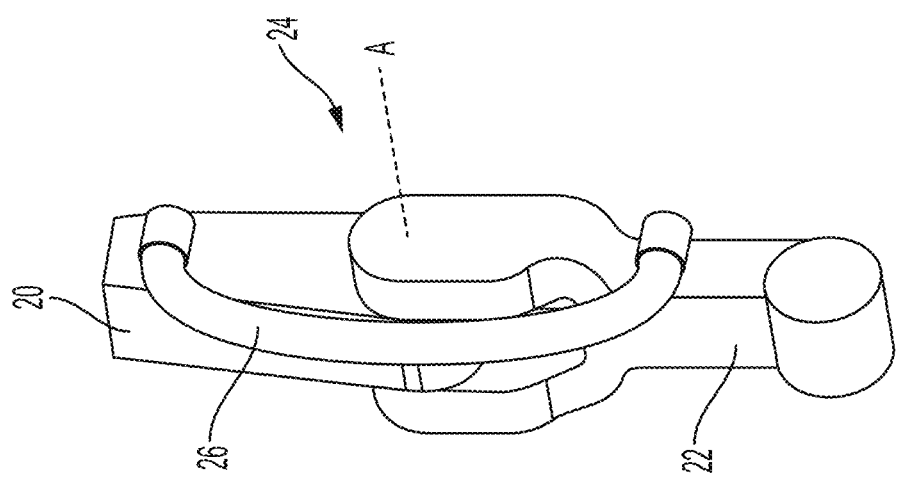
Figure 2C:
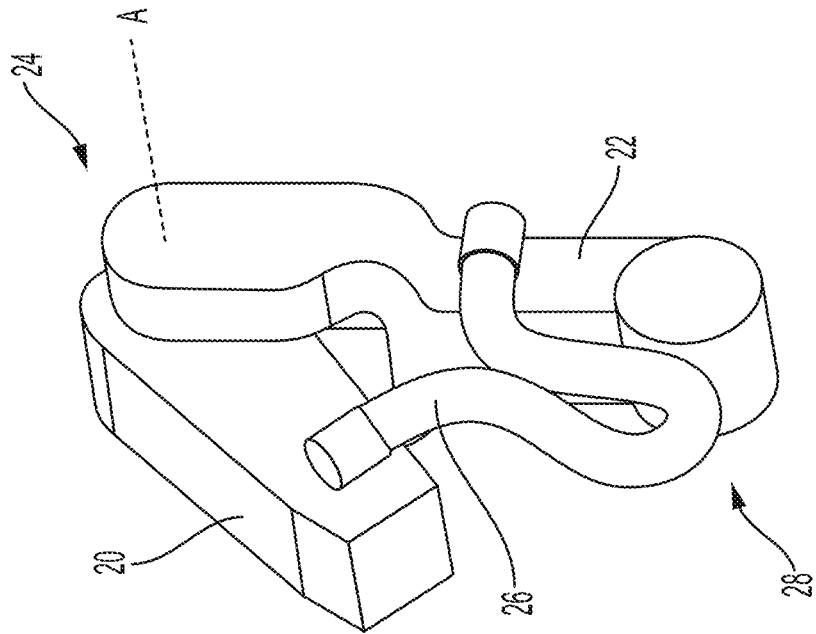
Figure 2D:
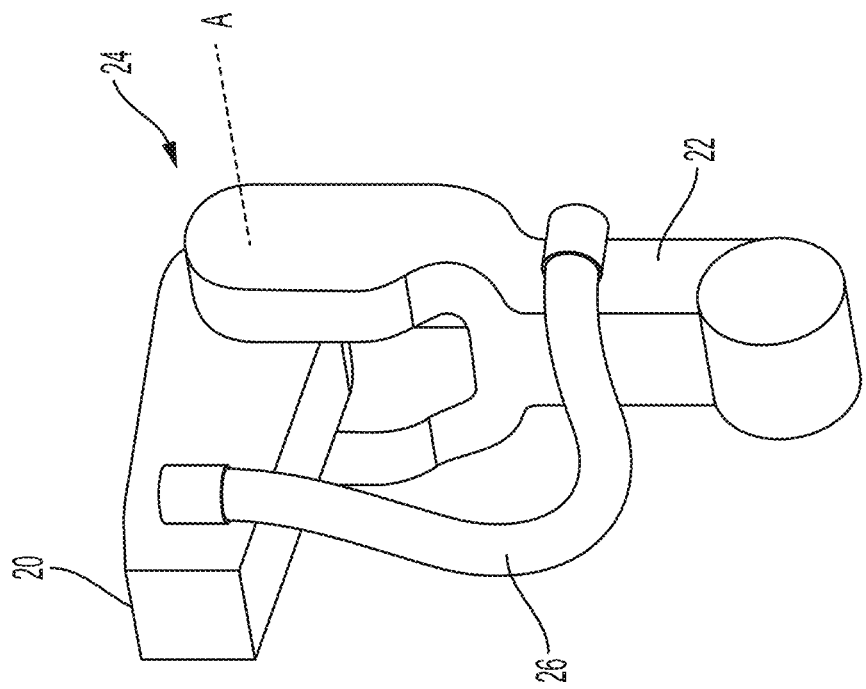
Figure 3B:
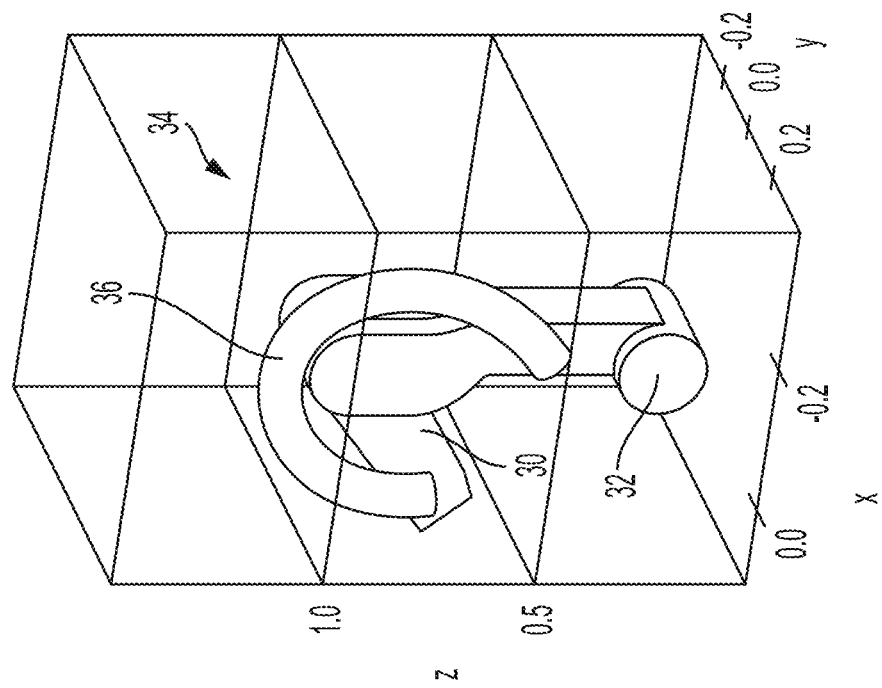
FIGS. 3A and 3B show illustrative diagrammatic views of two arm sections of an articulated arm with a section of a hose attached to the arm sections of the prior art with the hose section outside of a bend joint.
Figure 3A:
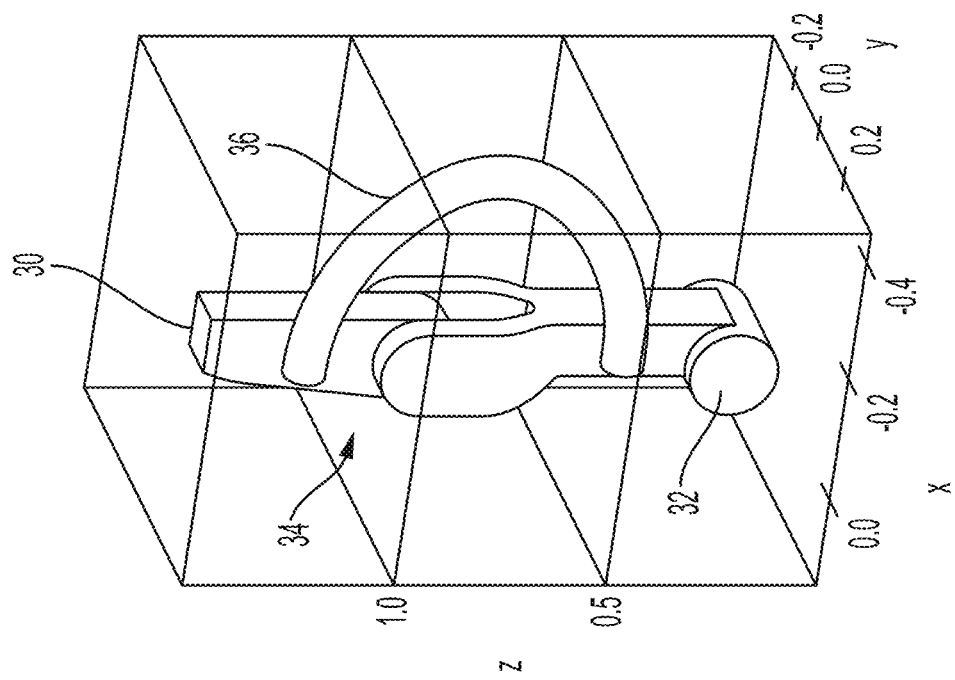
Figure 4B:
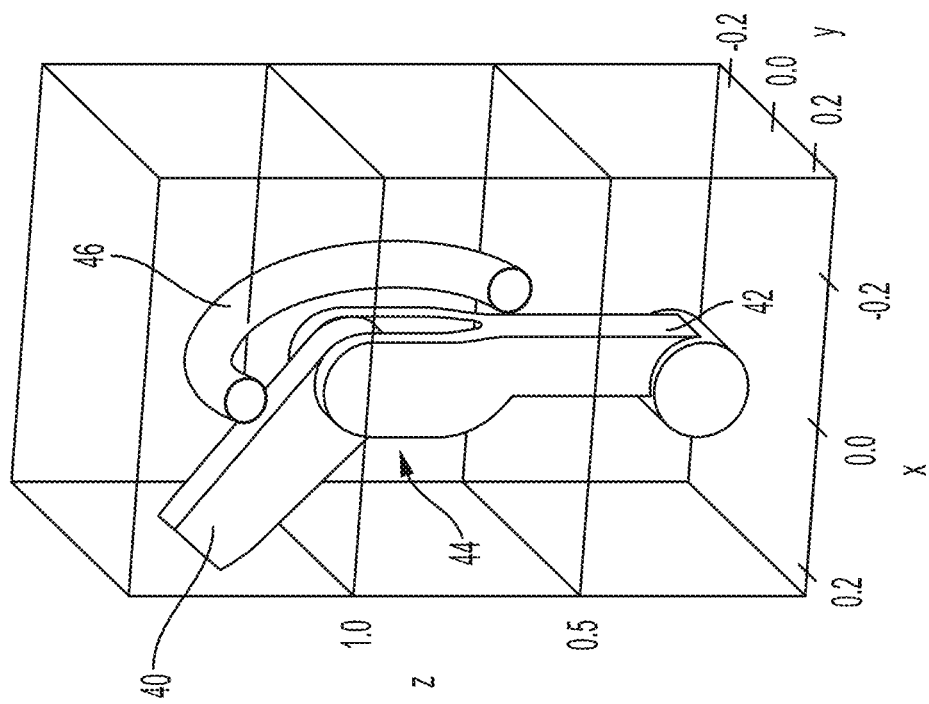
FIGS. 4A and 4B show illustrative diagrammatic views of two arm sections of an articulated arm with a section of a hose attached to the arm sections in accordance with an aspect of the invention showing two different views of the arm sections in the same position.
Figure 4A:
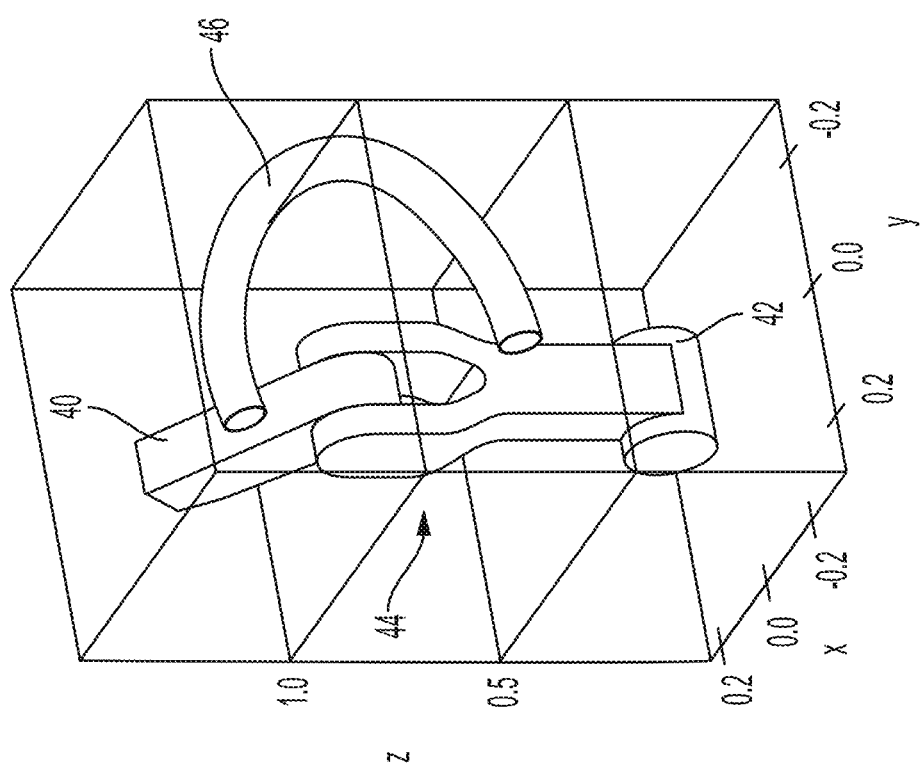

Instead of bending in the plane of the motion of the rotating links (articulated arm sections), the hose is mounted in a way that it bends out of the plane of the articulated arm sections' motion. As shown in FIGS. 4A and 4B from two views, a hose section 46 is attached to two arm sections 40, 42 at two ends by any of (1) rigidly with a fixed mount; (2) on a swivel mount allowed to rotate about an axis; or (3) on an actively actuated mount. The arm sections 40, 42 are each coupled to a joint 44. If mounted rigidly, i.e., case (1), the tangents to the hose at these points is nearly perpendicular to the plane of motion, or set at an angle that reduces both the maximum bending, and maximum change in bending. In the latter two cases (2) or (3), the axes of the rotation for passive or active swiveling are nearly parallel to the plane of the motion.

As the attachment points are positioned close to each other, the hose tangents at the attachment points become nearer to perpendicular to the plane of motion. As the attachment points are positioned more distant from each other, the hose tangent points become nearer to the plane of the link motion. In accordance with further aspects of the invention, as the sections rotate about a joint's axis of rotation, the hose slides through and/or rotates about attached mounts that swivel about mount axes of rotation.

Figure 5B:
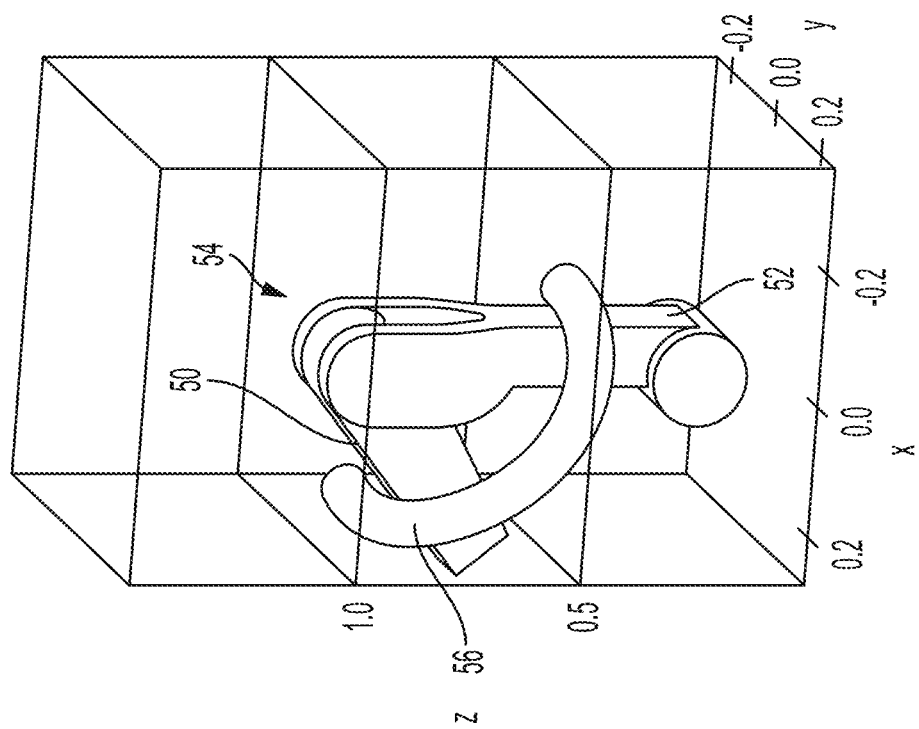
FIGS. 5A and 5B show illustrative diagrammatic views of two arm sections of an articulated arm with a section of a hose attached to the arm sections in accordance with an aspect of the invention showing the hose section bent toward the viewing direction.
Figure 5A:
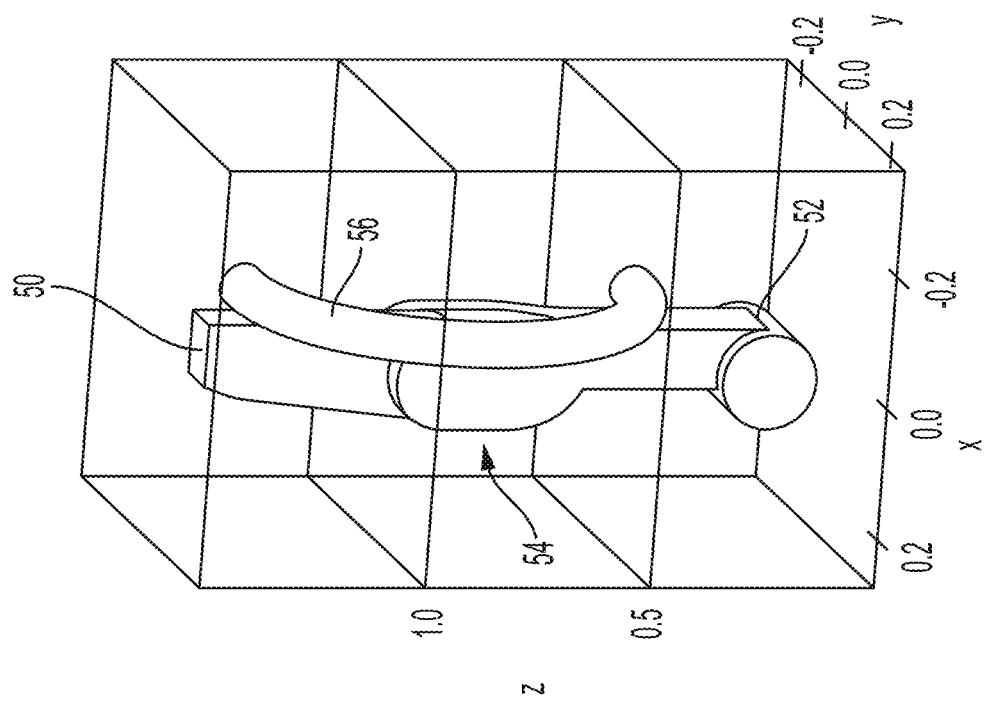
Figure 6B:
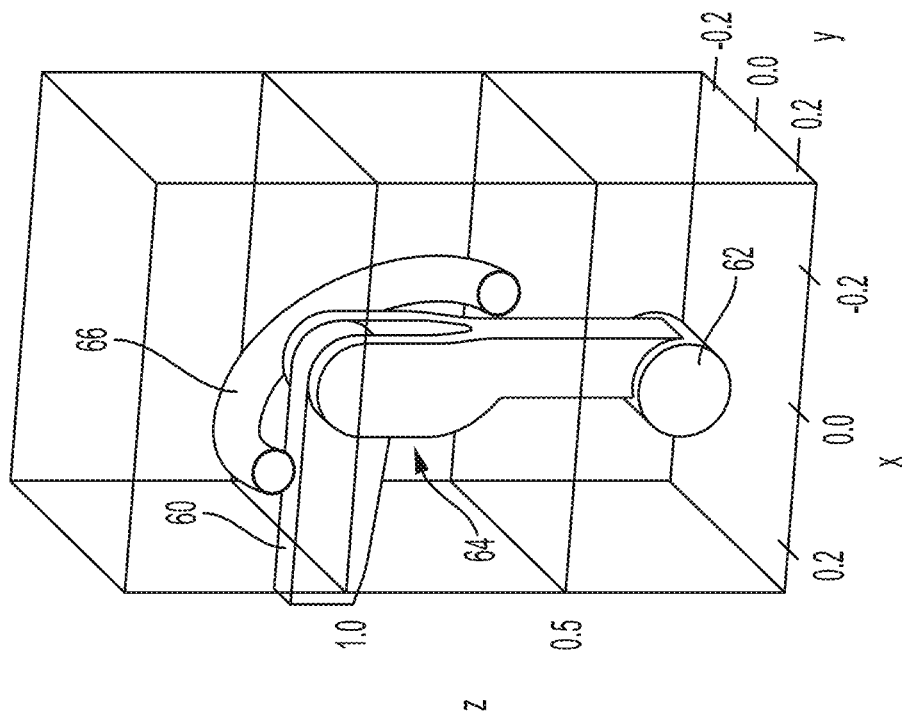
FIGS. 6A and 6B show illustrative diagrammatic views of two arm sections of an articulated arm with a section of a hose attached to the arm sections in accordance with an aspect of the invention showing the hose section bent away from the viewing direction.
Figure 6A:
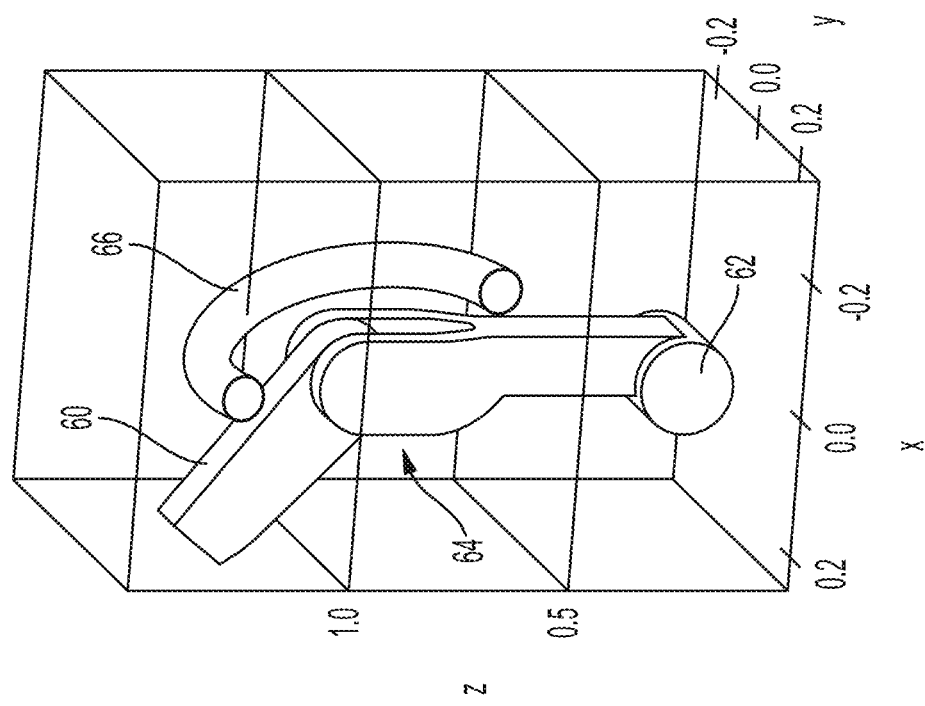

FIGS. 5A and 5B show arm sections 50, 52 of an articulated arm programmable motion robotic system that are coupled to a joint 54, with a joint portion of a hose 56 attached to the arm sections. The joint portion of the hose 56 remains out of plane with respect to the joint 54. FIGS. 6A and 6B show similar arm sections 60, 62 that are coupled to a joint 64 with a joint hose portion 66 on a far side (with respect to FIGS. 5A and 5B) of the joint 64. As shown in FIGS. 5A-6B, the joint hose section is not required to be on any particular side of the joint.

Though there remains a change in the bending during a motion, the degree of change in bending is lower than in a common hose routing scheme, as shown before. The strain—or change in bending—over the course of the motions is lower than with the in-plane scheme.

Figure 7:
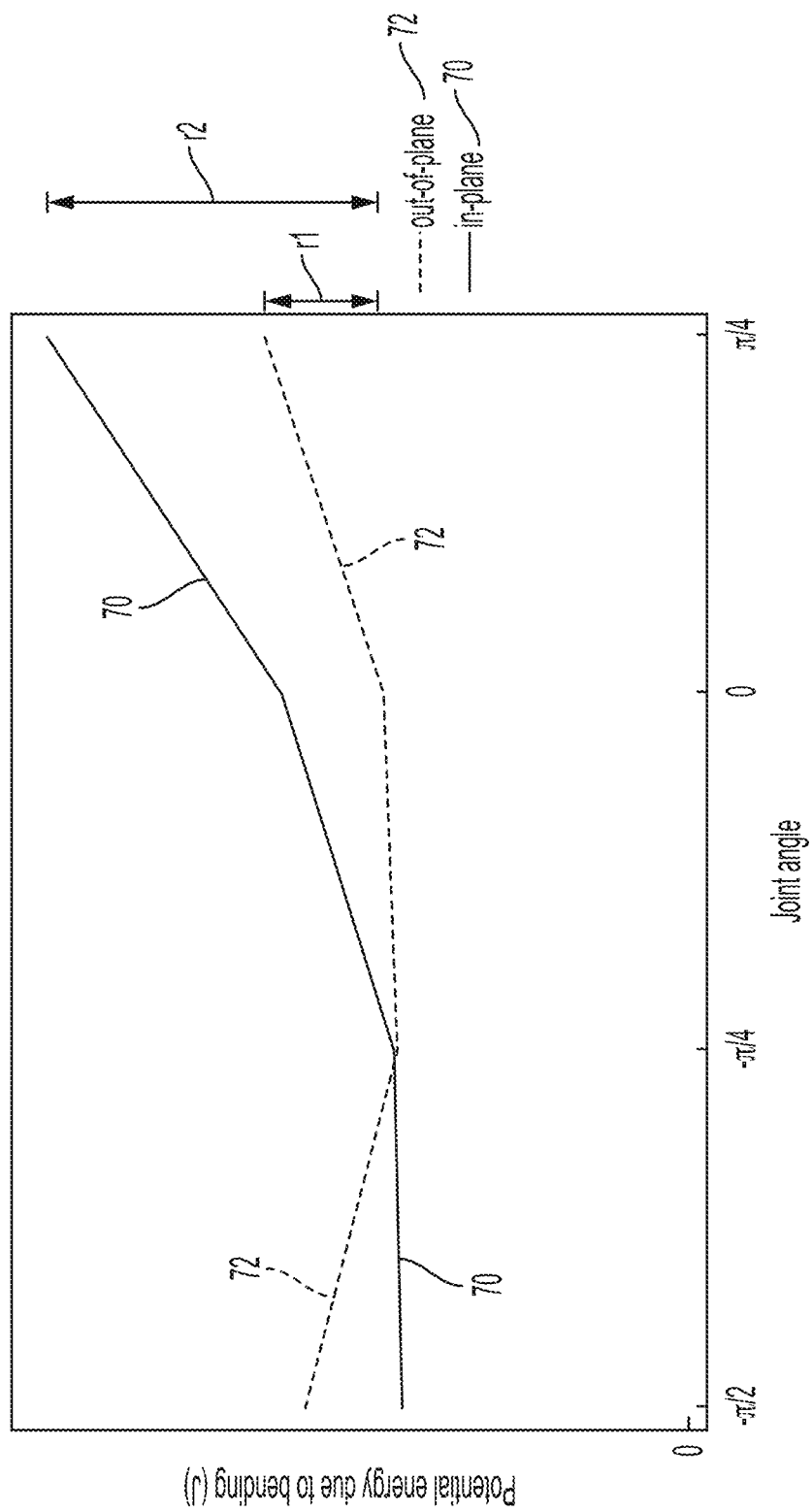
FIG. 7 shows an illustrative graphical representation of joint angle verses potential energy due to bending for in-plane and out-of-plane hose bending.

FIG. 7 shows a graphical representation of the total bending energy of the two schemes vs. the angle of rotation between arm sections. The in-plane scheme has higher hose stress and change in hose stress over the different motions. In particular, FIG. 7 shows at 70 the amount of potential energy (in Joules) due to bending over joint angles in a conventional in-plane routing technique in which a hose is mounted to arm sections such that it rotates in the plane of the joint. FIG. 7 shows at 72 the amount of potential energy (in Joules) due to bending over joint angles in a system incorporating routing in accordance with aspects of the present invention. Note that the range of potential energy values for the out-of-plane routing, $r_1$, is substantially less than the range of potential energy values for the in-plane routing, $r_2$. Although the hose will still experience some stress, the range of change in such stress (as well as the highest amount of such stress) will be significantly less.

Figure 8:
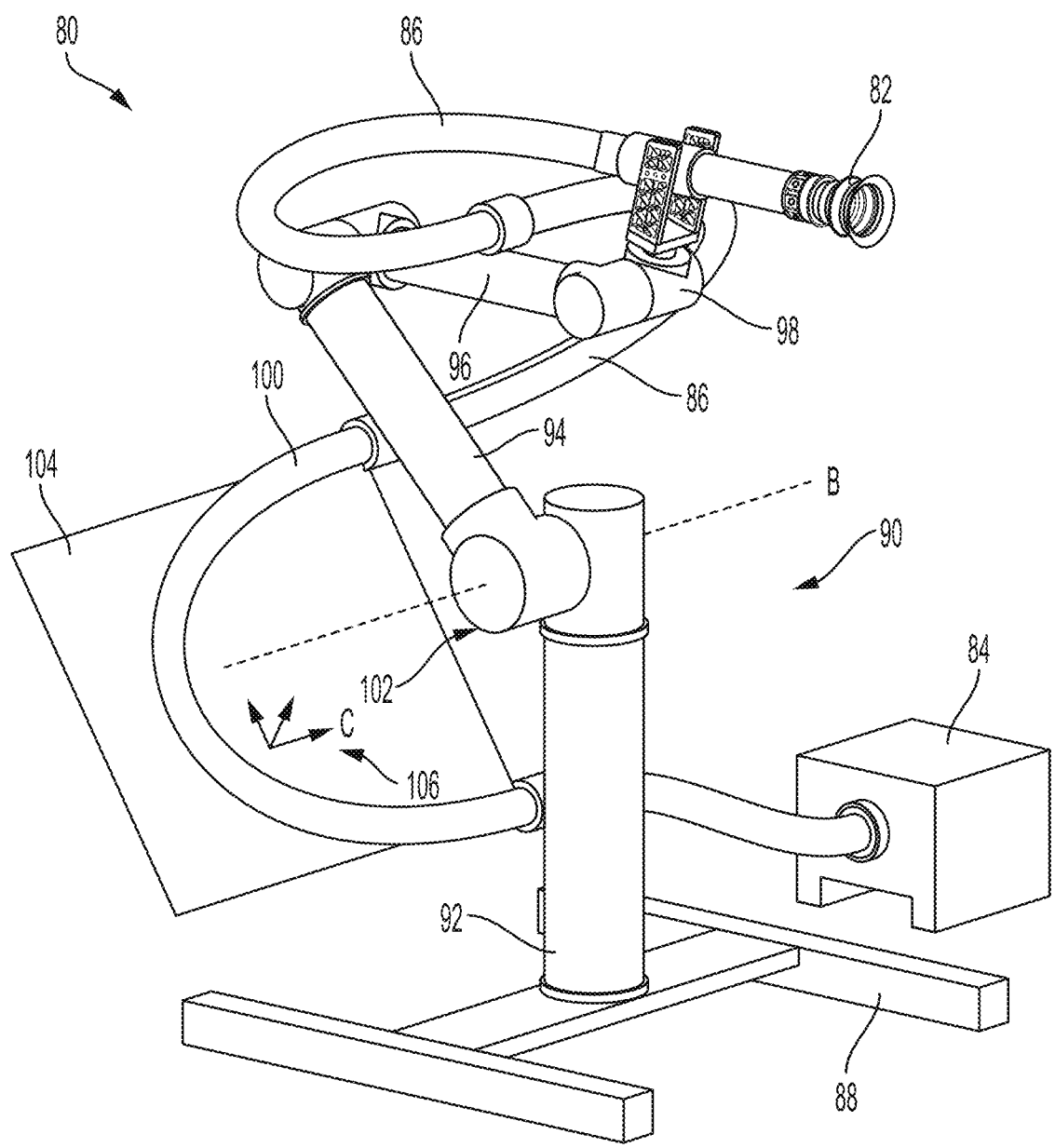
FIG. 8 shows an illustrative diagrammatic view of an articulated arm system showing an axis of rotation of a joint B and a plane C in which a hose section is positioned.

FIG. 8 shows at 80 an articulated arm programmable motion robotic system that includes a vacuum end effector 82 (e.g., including a flexible bellows) that is coupled to a vacuum source 84 by a hose 86. The system includes a base 88 that supports an articulated arm 90 having arm sections 92, 94, 96 and 98. A section of the hose, hose section 100, is coupled to adjacent arm sections 92, 94 that are each coupled to a joint 102 by which the arm sections 92, 94 may be rotated about an axis B. The joint portion of the hose 100 is mounted to define a plane 104 (e.g., through the center of the hose section 100), and such plane 104 is defined by having a plurality of directions as shown at 106. In accordance with an aspect of the invention, one of these directions (C as labelled) is parallel with the axis B.

Figure 9:
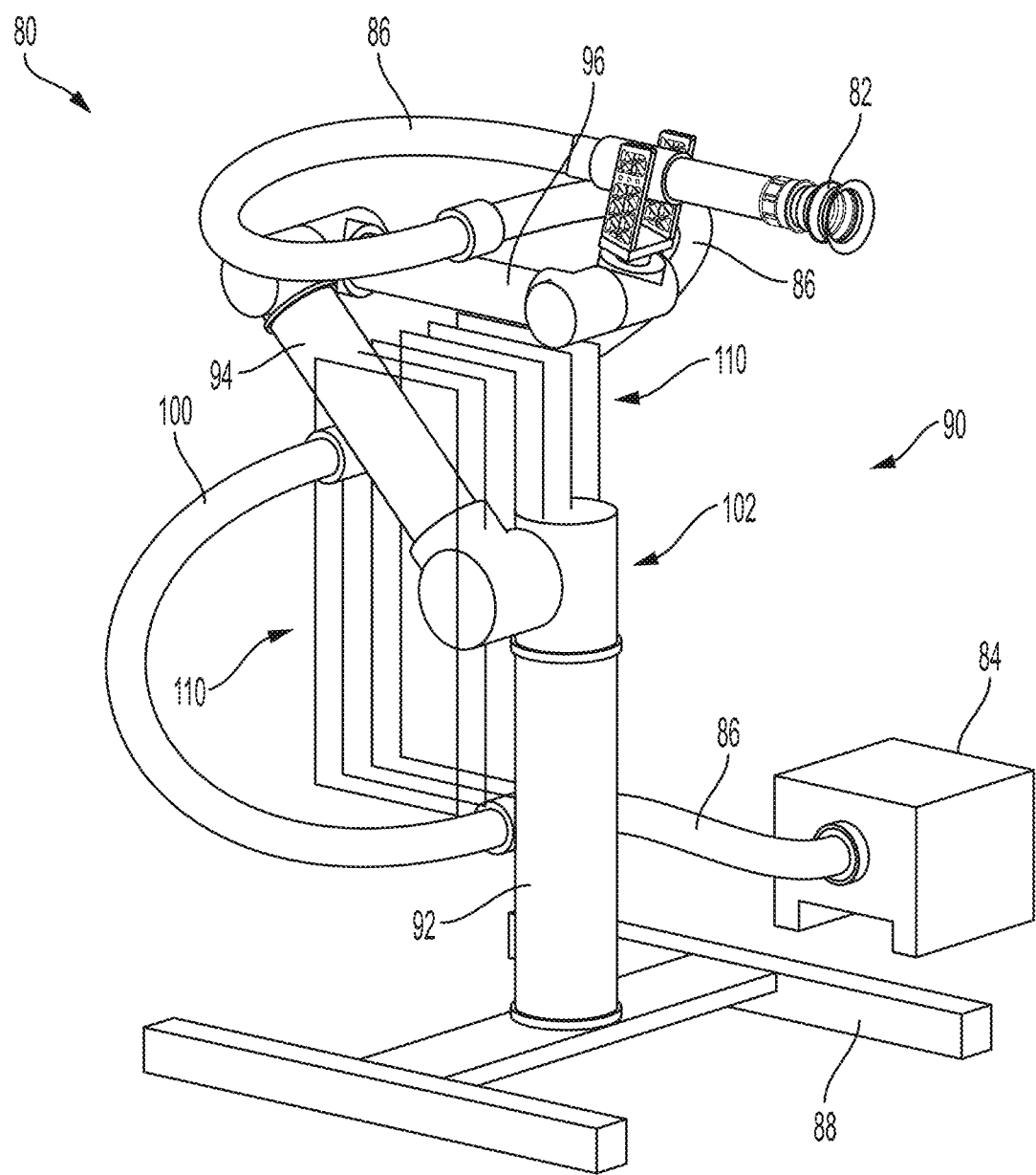
FIG. 9 shows an illustrative diagrammatic view of the articulated arm system of FIG. 8 showing the axis of rotation of the same joint shown in FIG. 8 showing planes running perpendicular to the joint.

FIG. 9 shows the system 80 that includes the articulated arm programmable motion robotic system that includes the vacuum end effector 82 that is coupled to the vacuum source 84 by the hose 86. Again, the system includes the base 88 that supports the articulated arm 90 having arm sections 92, 94, 96 and 98. Similarly, the section of the hose 100 is coupled to adjacent arm sections 92, 94 that are each coupled to the joint 102 by which the arm sections 92, 94 may be rotated about an axis B as discussed with respect to FIG. 8. During such rotation of the arm sections 92, 94 at the joint 102, the arm sections 92, 94 will define a plurality of planes as shown at 110. The plurality of planes 110 span the width of the joint 102. The joint portion of the hose 100 is mounted such that the joint portion of the hose 100 lies substantially outside of the plurality of planes 110.

In accordance with various aspects of the invention, the vacuum at the end effector may have a flow rate of at least 100 cubic feet per minute, and a vacuum pressure of no more than 50,000 Pascals below atmospheric. The hose may have an inner diameter of at least 1 inch (or at least 3 inches), and may include a helical ribbing as discussed above.

Figure 10:
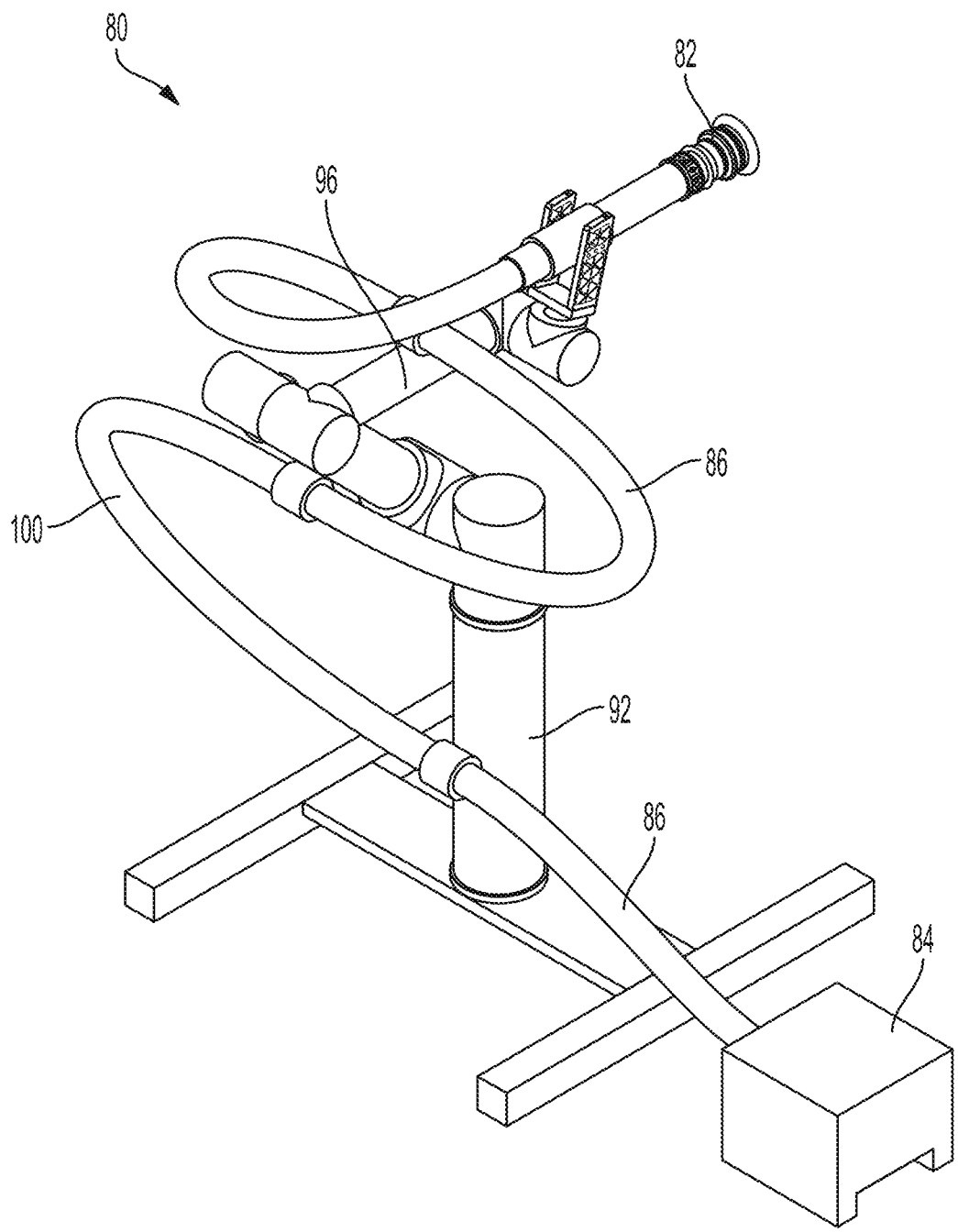
FIG. 10 shows an illustrative diagrammatic rear view of the articulated arm system of FIG. 8.
Figure 11:
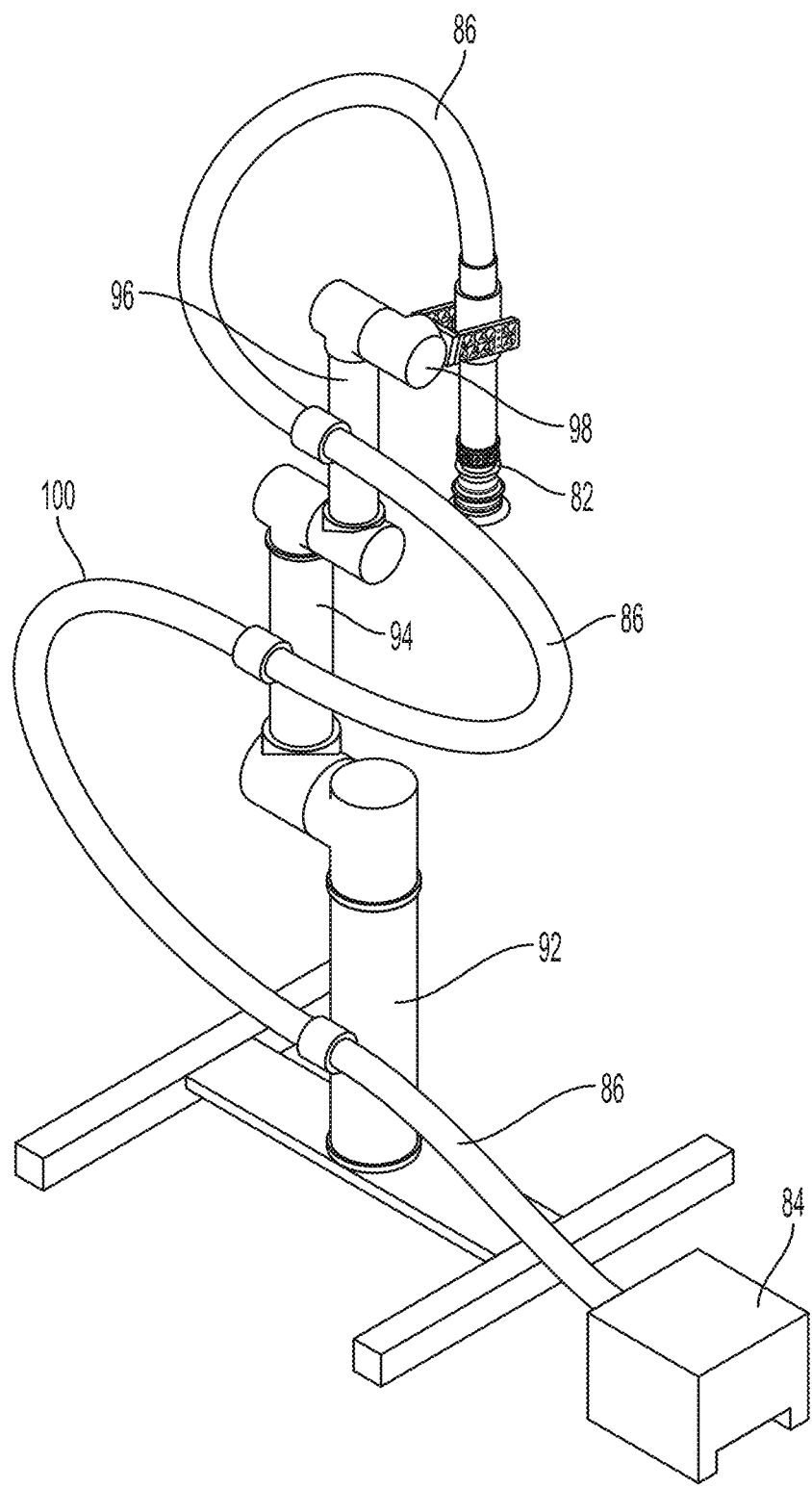
FIG. 11 shows an illustrative diagrammatic rear view of the articulated arm system of FIG. 10 with a plurality of arm sections having been rotated about a plurality of joints.
Figure 13:
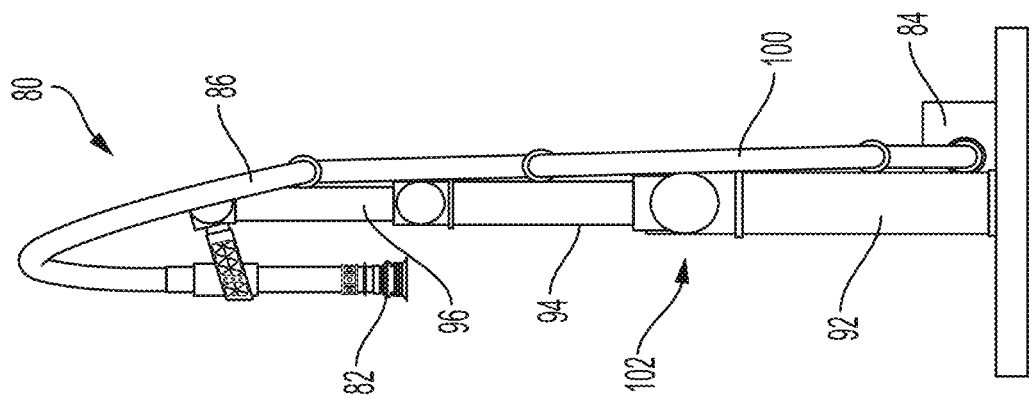
FIG. 13 shows an illustrative diagrammatic right side view of the articulated arm system of FIG. 11.
Figure 12:
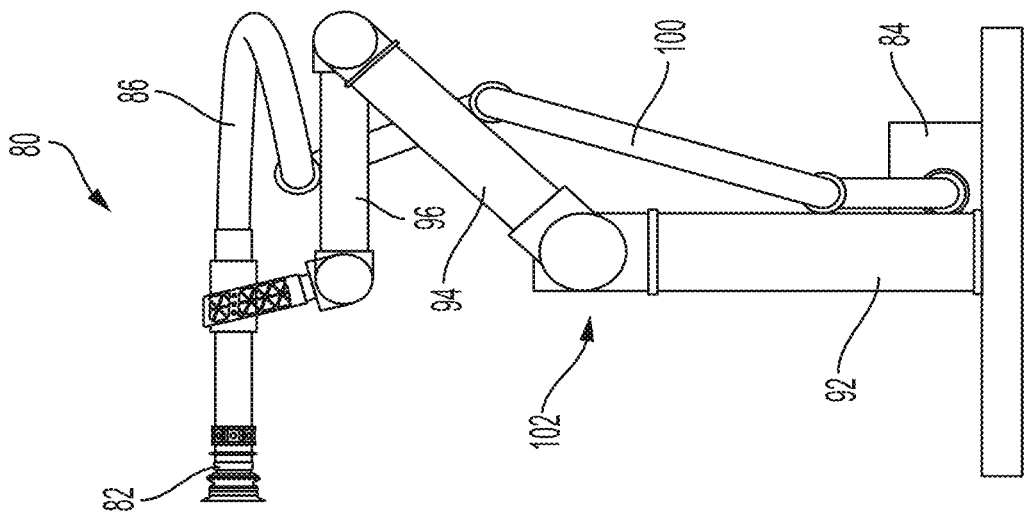
FIG. 12 shows an illustrative diagrammatic right side view of the articulated arm system of FIG. 10.
Figure 14:
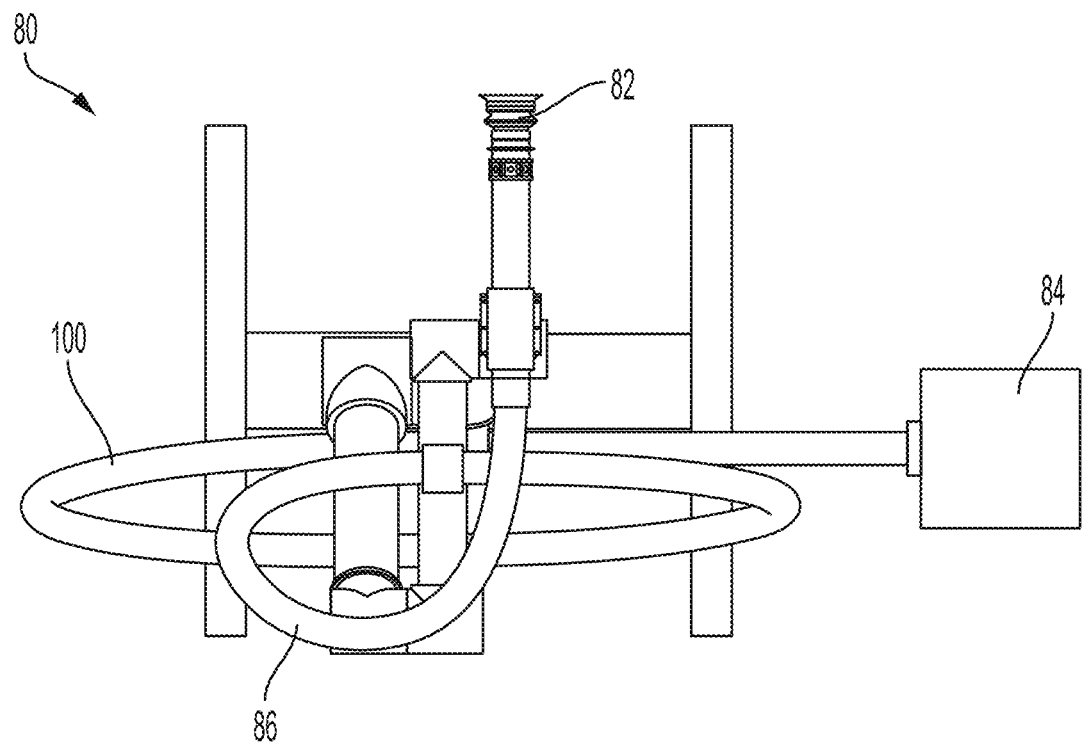
FIG. 14 shows an illustrative diagrammatic top view of the articulated arm system of FIG. 10.
Figure 15:
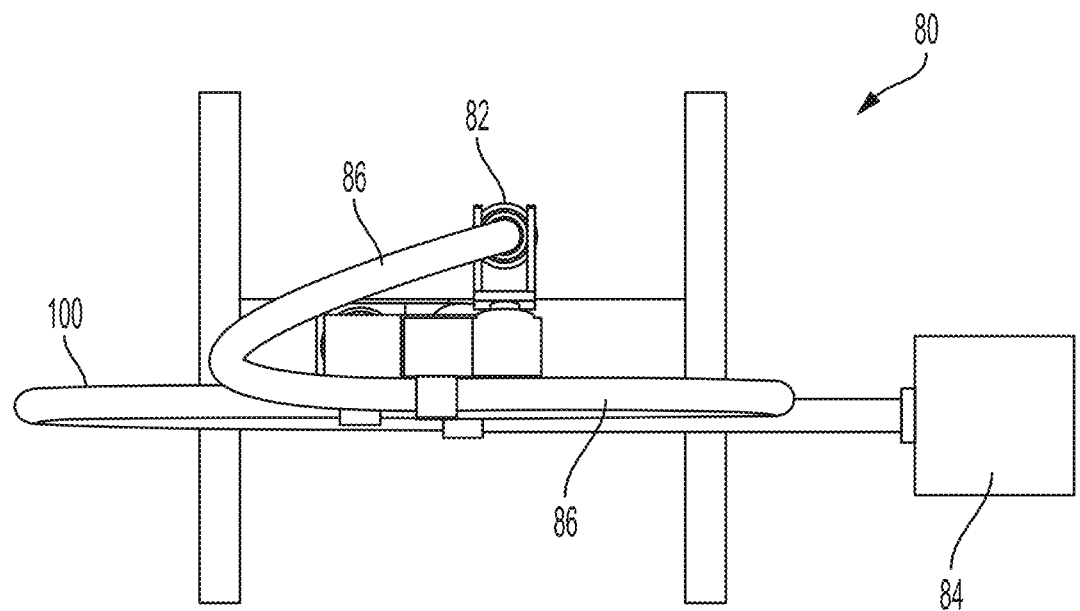
FIG. 15 shows an illustrative diagrammatic top view of the articulated arm system of FIG. 11.
Figure 17:
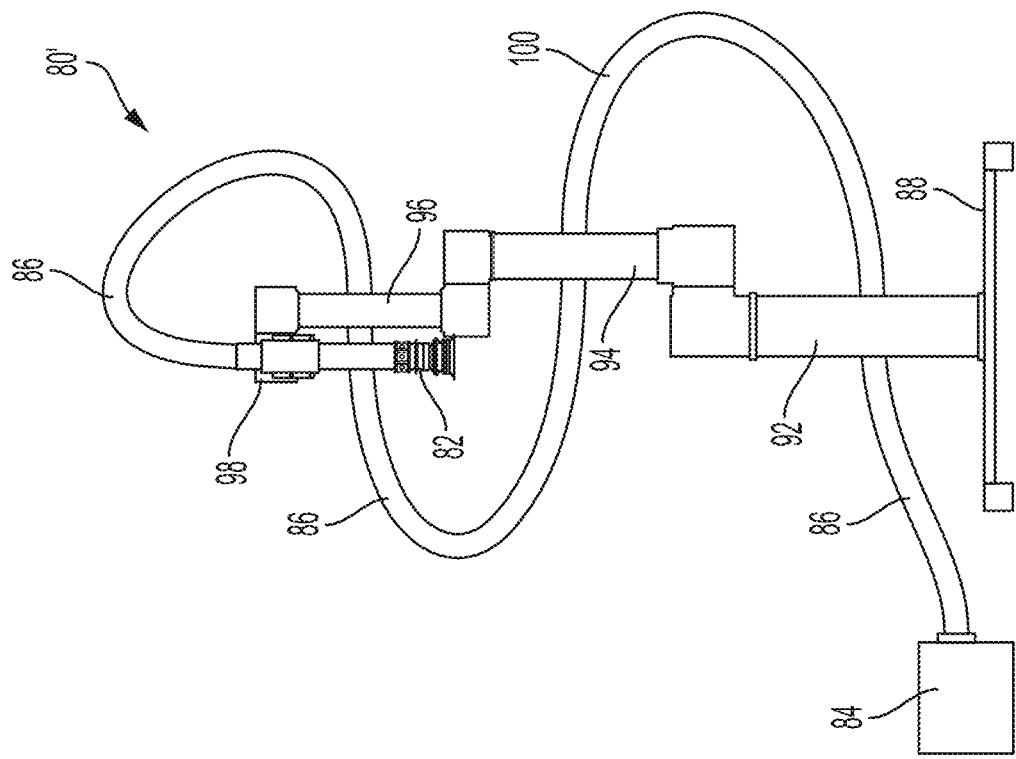
FIG. 17 shows an illustrative diagrammatic front view of the articulated arm system of FIG. 11.
Figure 16:
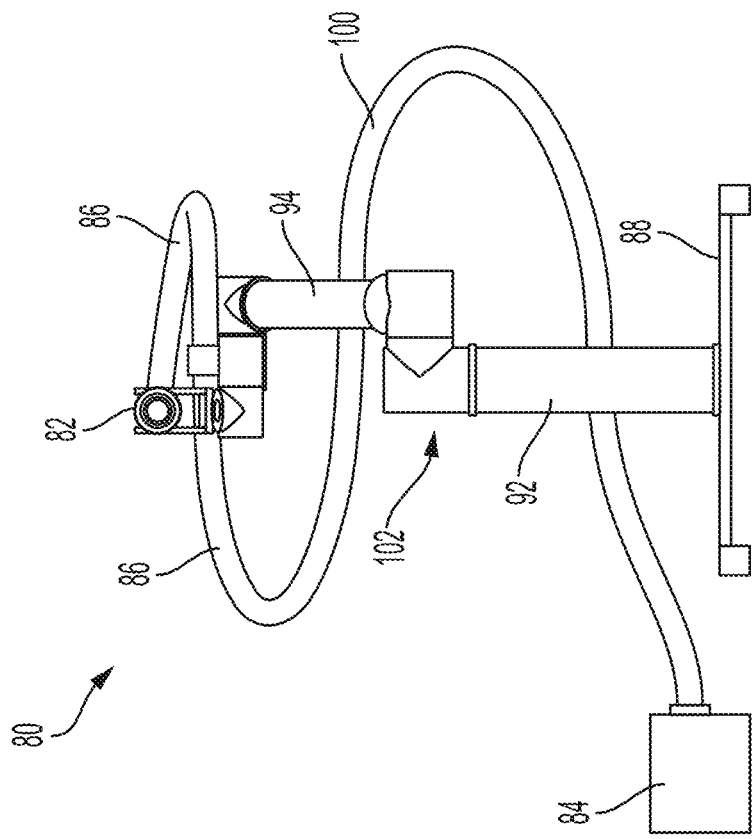
FIG. 16 shows an illustrative diagrammatic front view of the articulated arm system of FIG. 10.
Figure 19:
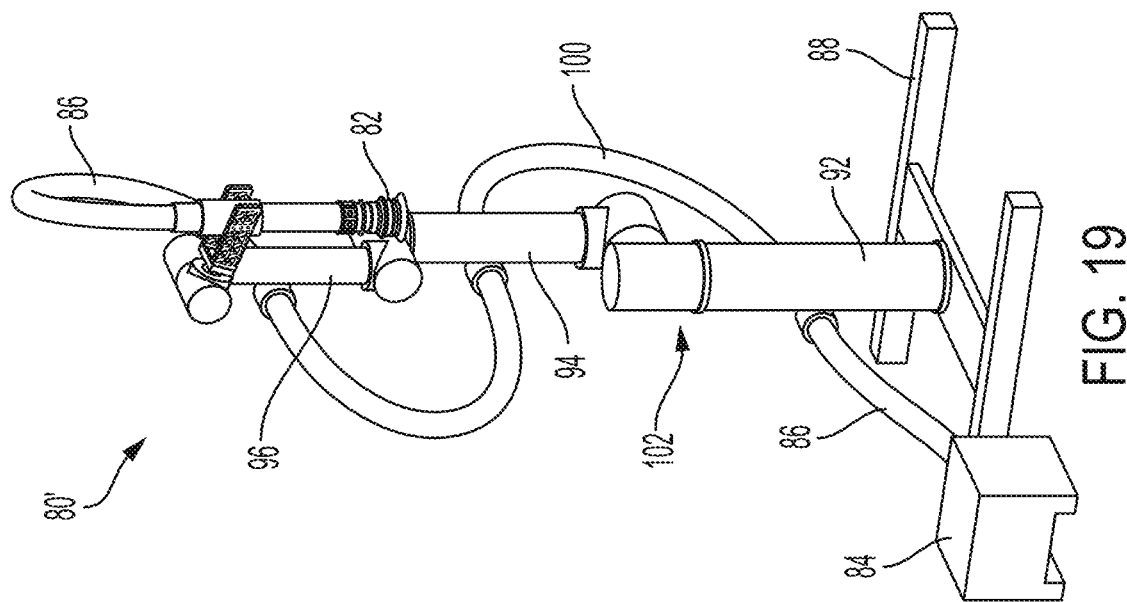
FIG. 19 shows an illustrative diagrammatic left side view of the articulated arm system of FIG. 11.
Figure 18:
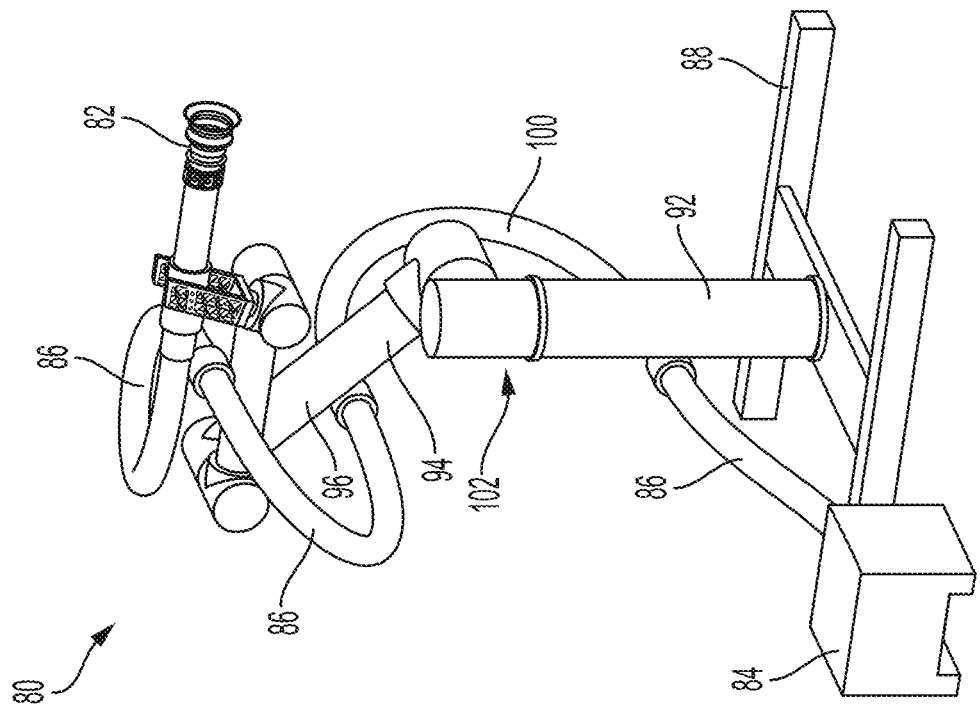
FIG. 18 shows an illustrative diagrammatic left side view of the articulated arm system of FIG. 10.

To better show the system from multiple angles, FIG. 10 shows a back perspective view of the system 80, FIG. 12 shows a left side view of the system 80, FIG. 14 shows a top view of the system 80, FIG. 16 shows a front view of the system 80 and FIG. 18 shows a left side perspective view of the system 80. FIGS. 11, 13, 15, 17 and 19 shows a system 80' in which the articulated arm of the system of FIGS. 10, 12, 14, 16 and 18 is moved such that the arm sections are extended in a single direction (to further show the hose routing). The components of the system of FIGS. 11, 13, 15, 17 and 19 are the same as those of FIGS. 10, 12, 14, 16 and 18. In particular, FIG. 11 shows a back perspective view of the system 80', FIG. 13 shows a right side view of the system 80', FIG. 15 shows a top view of the system 80', FIG. 17 shows a front view of the system 80' and FIG. 19 shows a left side perspective view of the system 80'.

Figure 20:
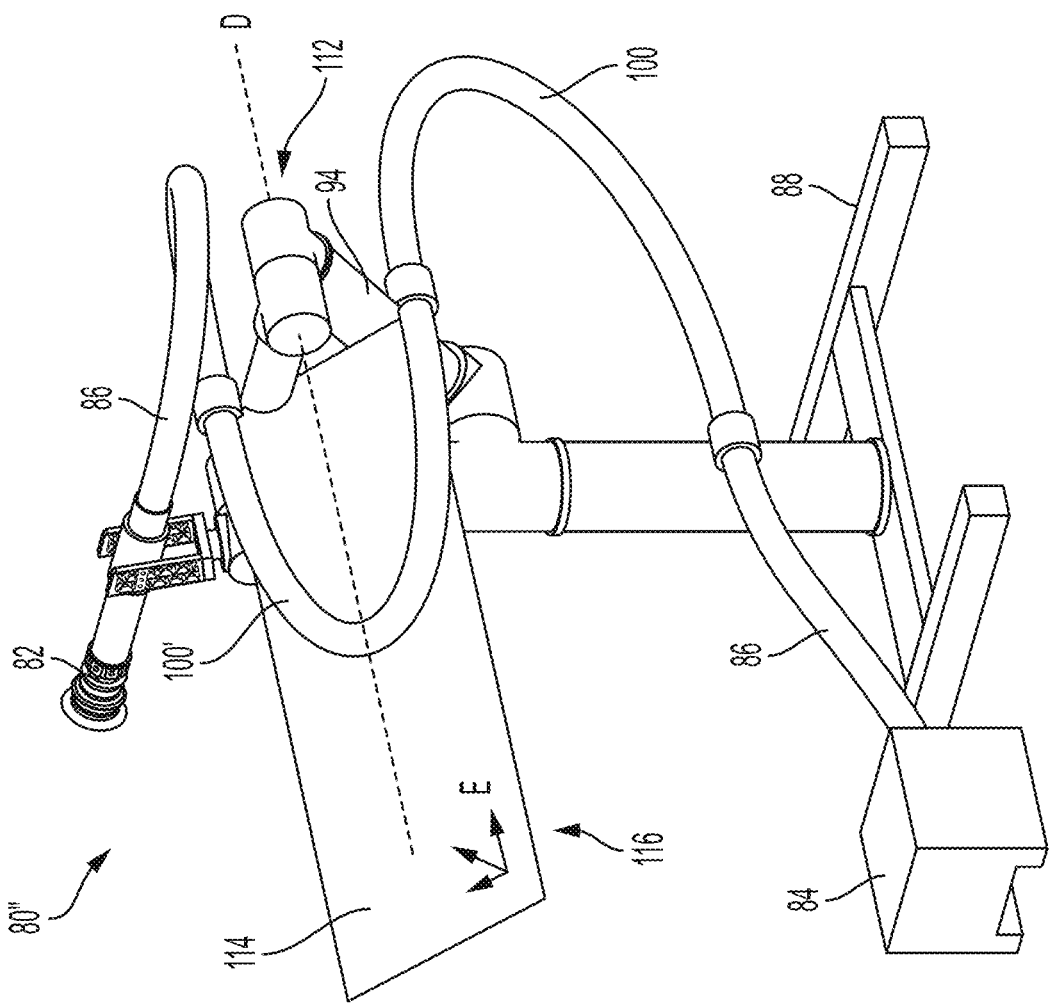
FIG. 20 shows an illustrative diagrammatic rear view of the articulated arm system of FIG. 8 showing a hose section plane E that is parallel with an axis of rotation D of an associated joint.
Figure 22:
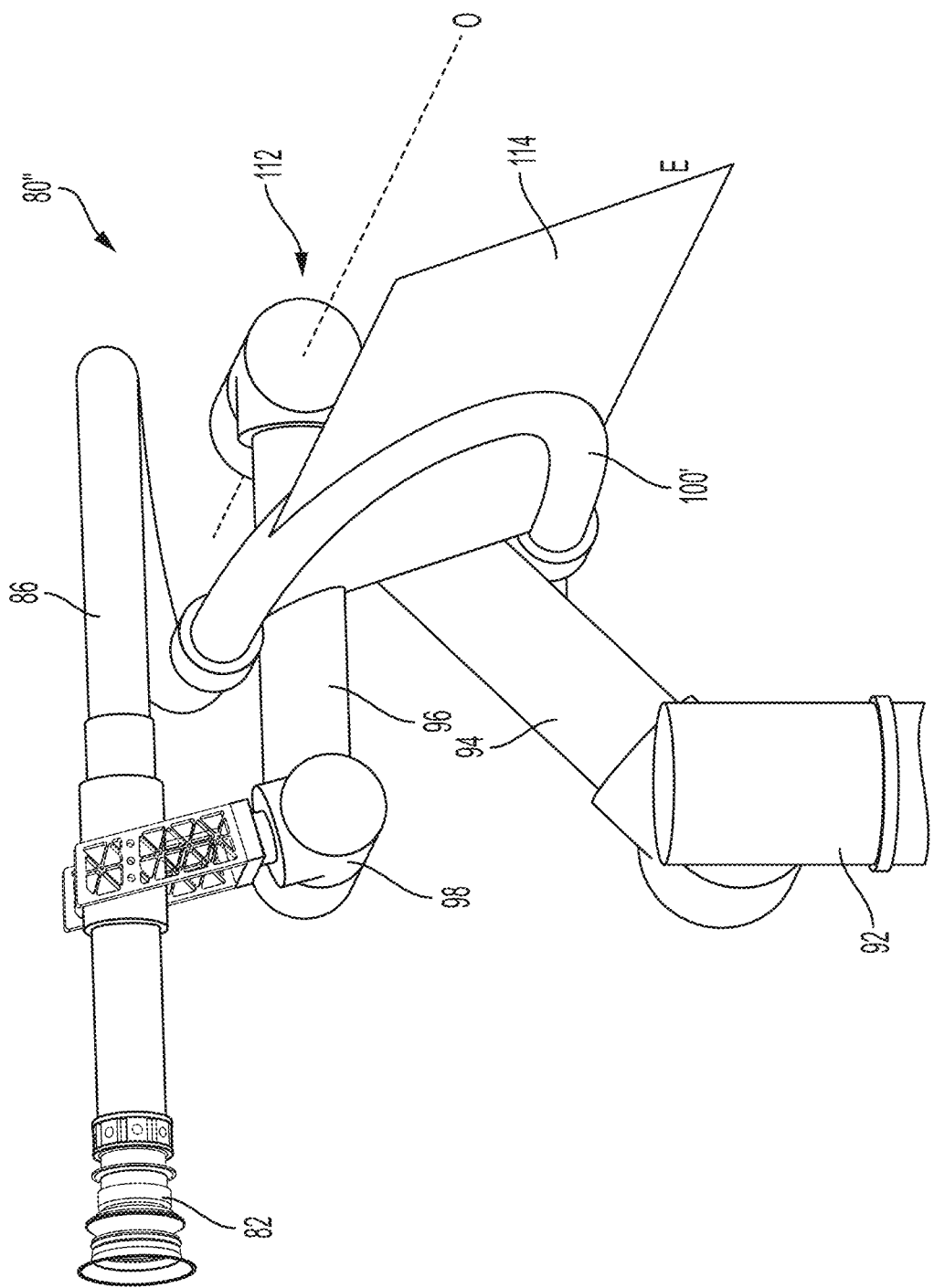
FIG. 22 shows an illustrative diagrammatic enlarged side view of the articulated arm system of FIG. 20.
Figure 23B:
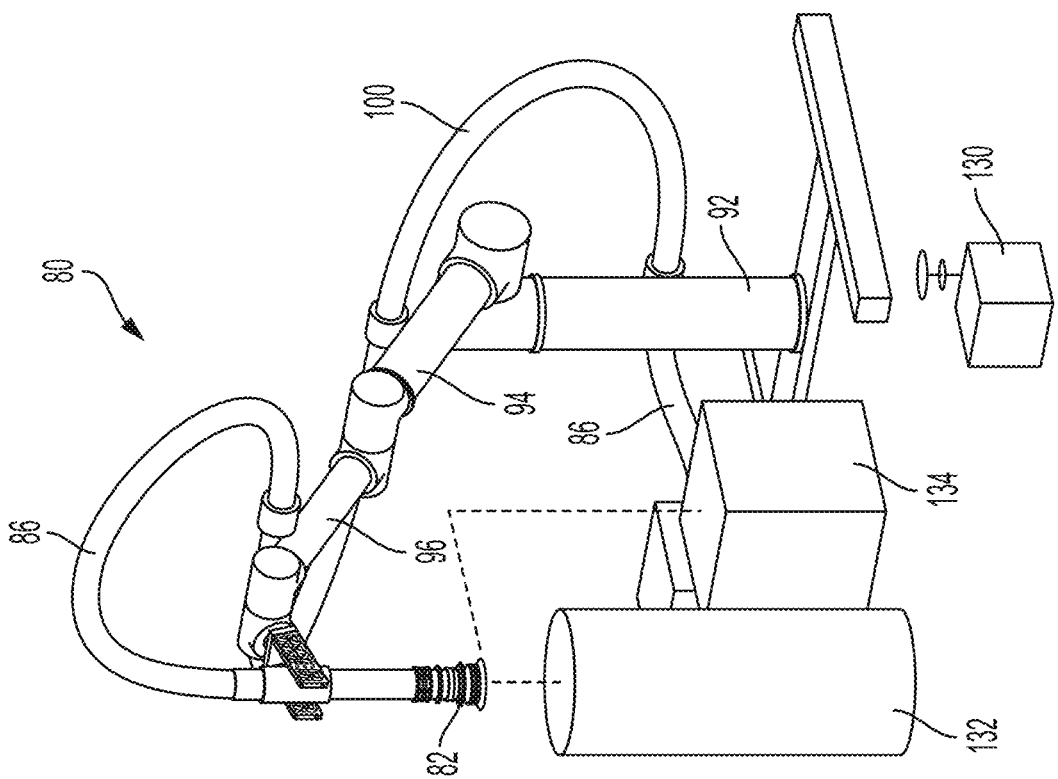
FIGS. 23A-23D show illustrative diagrammatic views of an articulated arm system in a working environment moving objects while employing a hose routing system in accordance with an aspect of the present invention.
Figure 23A:
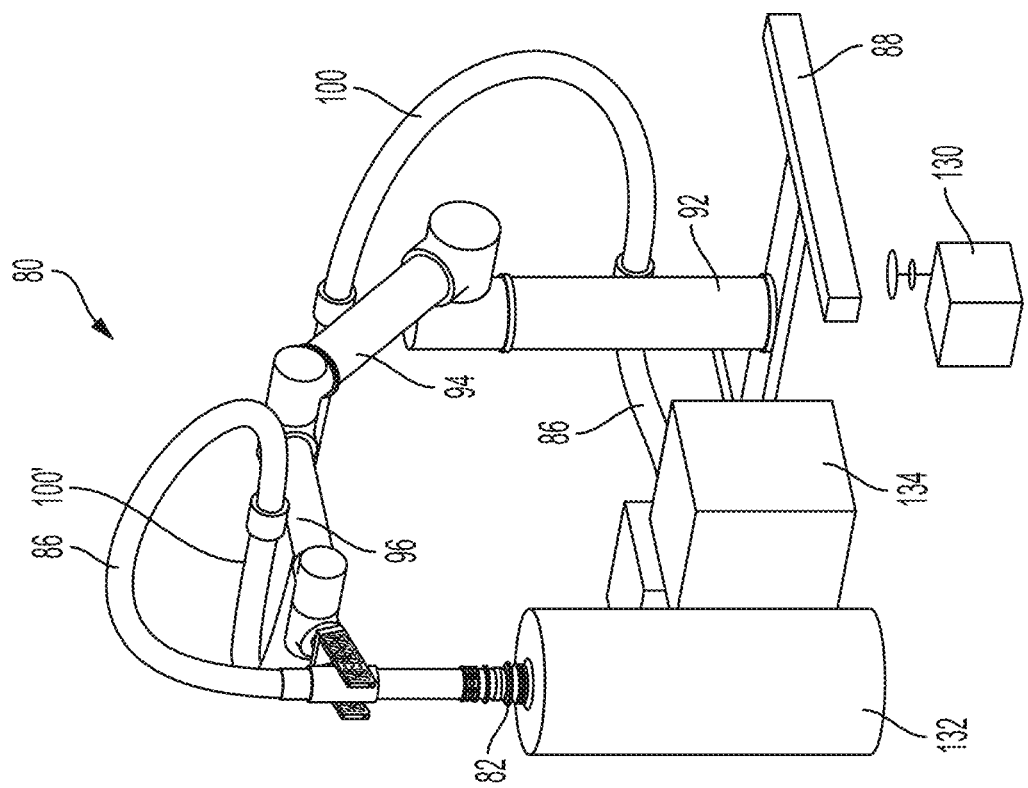
Figure 23D:
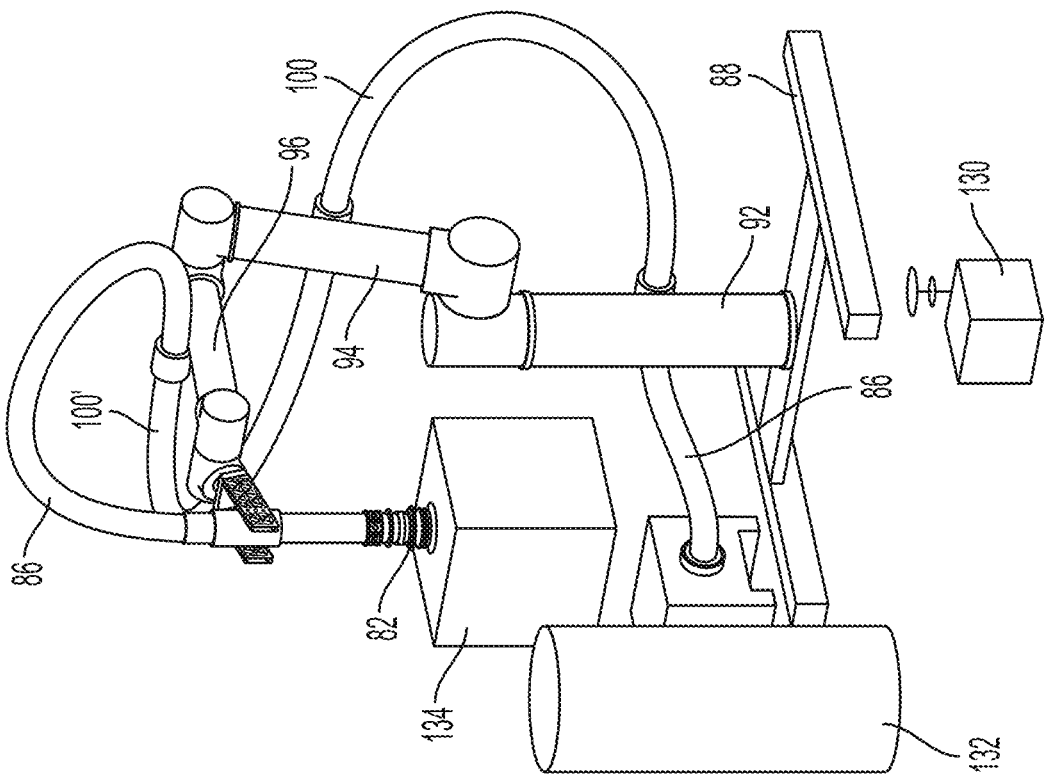
Figure 23C:
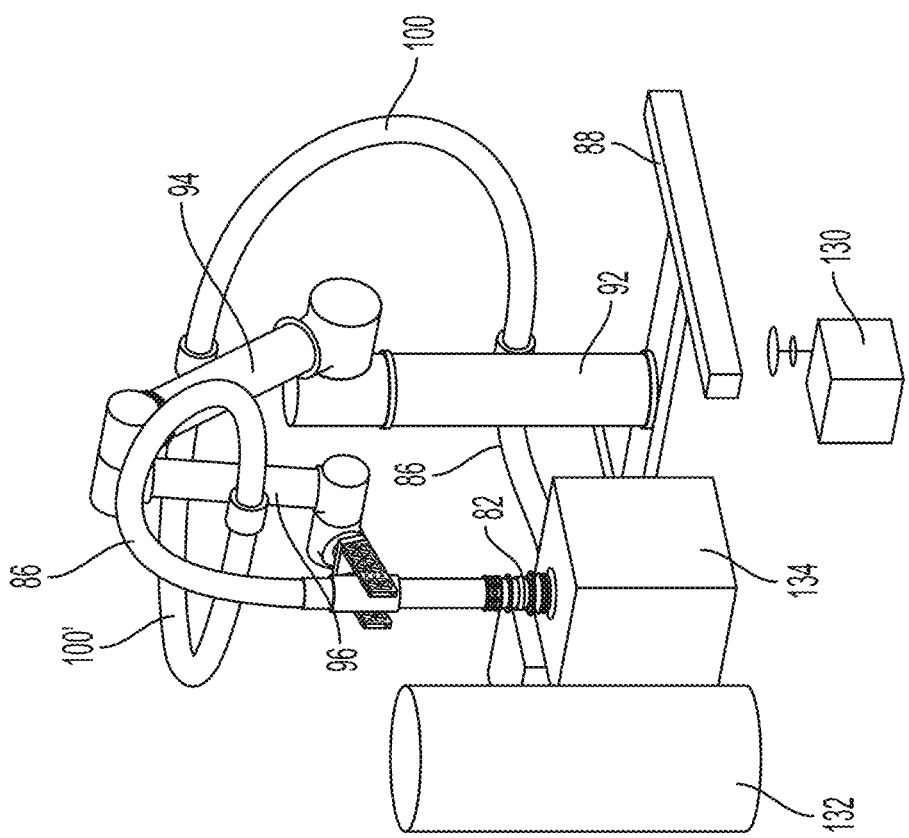

The hose routing of embodiments of the invention may be applied to a plurality of arm sections of an articulated arm system. FIG. 20, for example, shows a system 80" that includes a base 88 that supports an articulated arm 90 having arm sections 92, 94, 96 and 98. A section of the hose, hose section 100', is coupled to adjacent arm sections 94, 96 that are each coupled to a joint 112 by which the arm sections 94, 96 may be rotated about an axis D. The joint portion of the hose 100' is mounted to define a plane 114 (e.g., through the center of the hose section 100'), and such plane 114 is defined by having a plurality of directions as shown at 116. In accordance with an aspect, one of these directions (E as labelled) is parallel with the axis D. In such a system, both the hose section 100 and the hose section 100' of the hose 86 may be routed in accordance with various aspects of the present invention. FIG. 22 shows a close-up view of a portion of the system 80" of FIG. 20. As may be seen in FIG. 22, the hose section 100' defines a plane 114, for example, through a longitudinal center of the curved hose section 110'.

Figure 21:
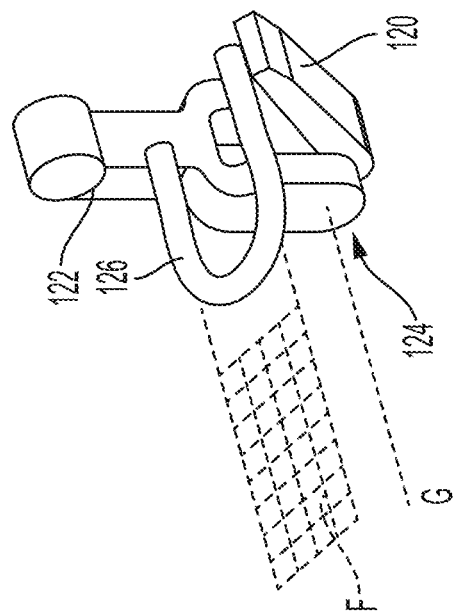
FIG. 21 shows an illustrative diagrammatic view of two arm sections showing a hose section plane F that is parallel with an axis of rotation G of an associated joint.

FIG. 21 shows an example of such out-of-plane routing with a joint and arm sections as shown in FIGS. 4A-6B. Such a system includes arm sections 120, 122 of an articulated arm programmable motion robotic system that are coupled to a joint 124, with a joint portion of a hose 126 attached to the arm sections. The joint portion of the hose 126 remains out of plane with respect to the joint 124. Again the plane F shown at 128 includes a direction that is parallel with an axis of rotation G of the joint 124.

FIGS. 23A-23D show the articulated arm programmable motion robotic system 80 that includes the vacuum end effector 82 that is coupled to the vacuum source 84 by the hose 86. The system includes the base 88 that supports the articulated arm 90 having arm sections 92, 94, 96 and 98. The section of the hose 100 is coupled to adjacent arm sections 92, 94 that are each coupled to the joint 102 by which the arm sections 92, 94 may be rotated. The joint portion of the hose 100 is mounted to define a plane that includes a direction that is parallel with the axis of rotation of the joint as discussed above. Further, the joint portion of the hose 100 lies substantially outside of the plurality of planes 110 defined by movement of the arm sections 92, 94 as also discussed above. Similarly, the section of the hose 100' is coupled to adjacent arm sections 94, 96 that are each coupled to a joint by which the arm sections 94, 96 may be rotated about an axis meeting the above requirements.

With reference to FIGS. 23A-23D, the articulated arm system may be employed, under control of one or more computer processing system(s) 130 to move from one object 132 (FIG. 23A) to another 134 (FIGS. 23B and 23C), and to then lift the new object 134. Note that when the arm sections 94 and 96 are moved to be very close to each other (shown in FIG. 23C), the hose section 100' remains relatively free of bending and therefore stress.

The hose attachments may be fixed, may provide swiveling, and/or may provide for translation of the hose through the attachments in various aspects of the invention. The swivel attachments may also have more than one degree of freedom (DOF). While the swivel may only allow rotation of the hose about an axis that is in the plane of the motion, a swivel joint may accommodate other additional DOFs including: the hose may twist through the mount to reduce torsion on the hose, the hose may slip through the mount to lengthen or shorten the hose segment between attachment points, and the attachment may permit small deflections of the rotation axis also to reduce total bending energy.

Figure 25:
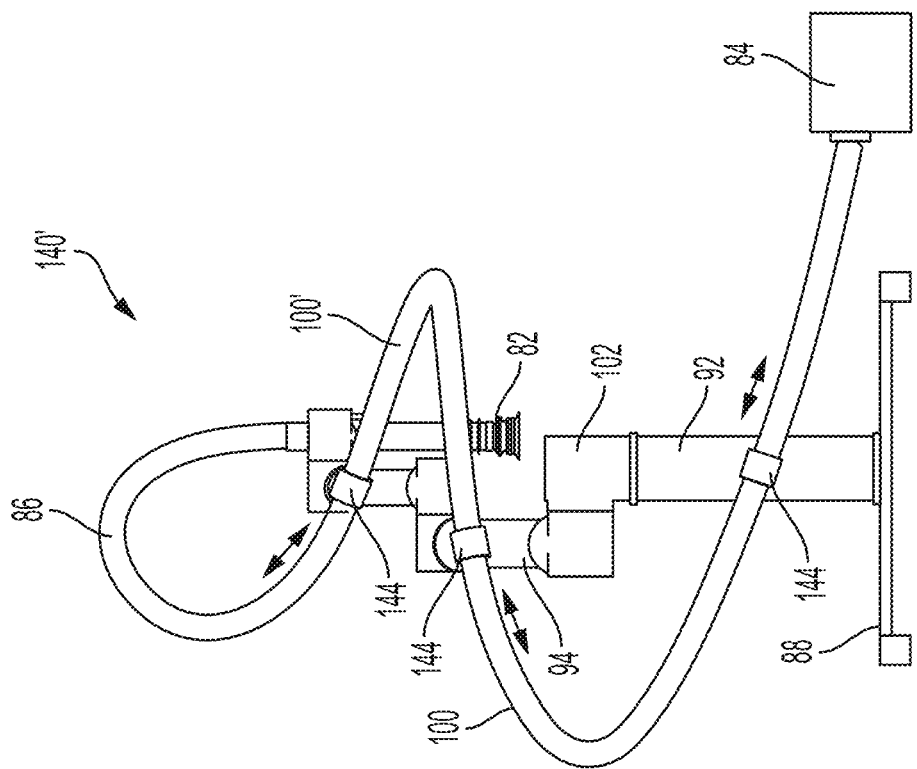
FIG. 25 shows an illustrative diagrammatic rear view of the articulated arm system of FIG. 8 employing swivel hose mounts in accordance with an aspect of the invention.
Figure 24:
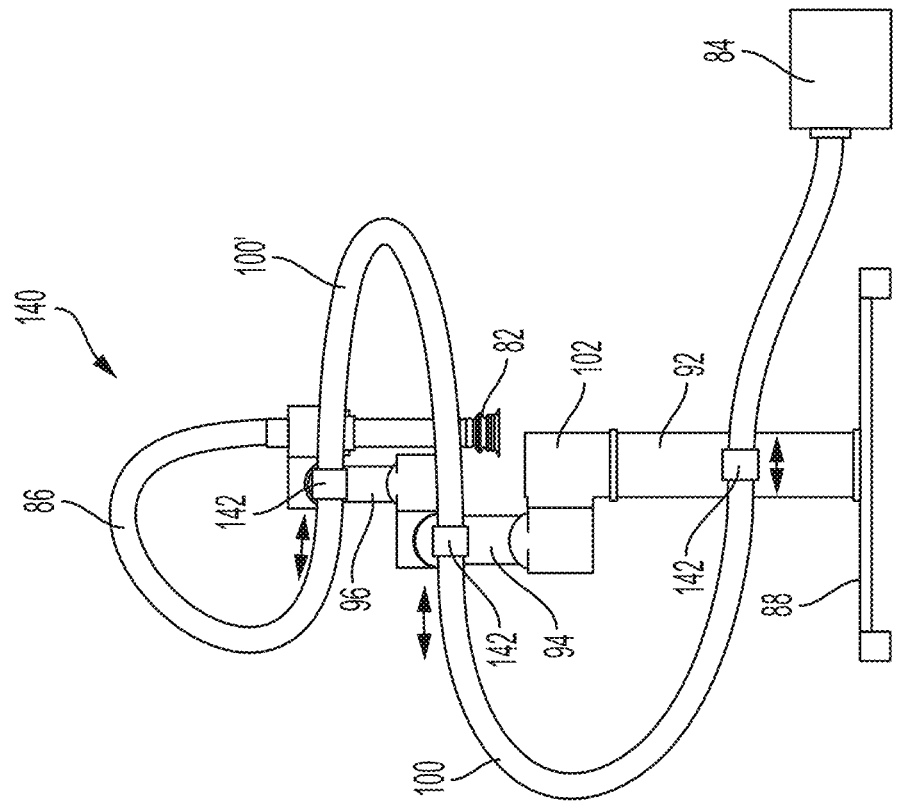
FIG. 24 shows an illustrative diagrammatic rear view of the articulated arm system of FIG. 8 employing fixed position hose mounts in accordance with an aspect of the invention.

FIGS. 24 and 25 show articulated arm programmable motion robotic systems 140 and 140' that include the vacuum end effector 82 that is coupled to the vacuum source 84 by the hose 86. The systems include the base 88 that supports the articulated arm 90 having arm sections 92, 94, 96 and 98. The section of the hose 100 is coupled to adjacent arm sections 92, 94 that are each coupled to the joint 102 by which the arm sections 92, 94 may be rotated. Again, the joint portion of the hose 100 is mounted to define a plane that includes a direction that is parallel with the axis of rotation of the joint as discussed above. Further, the joint portion of the hose 100 lies substantially outside of the plurality of planes defined by movement of the arm sections 92, 94 as also discussed above. Similarly, the section of the hose 100' is coupled to adjacent arm sections 94, 96 that are each coupled to a joint by which the arm sections 94, 96 may be rotated about an axis meeting the above requirements.

The hose attachments 142 of the system 140 are fixed position, yet may optionally permit translation of the hose through the attachments as shown by the double ended arrows. The hose attachments 144 of the system 140' are swivel attachments that may rotate with the hose, and further may permit translation of the hose through the attachments as also shown by the double ended arrows. Note that the hose 86 in FIG. 25 with the swivel attachments, appears to be more free of stress than the hose in FIG. 24, and permits the hose to assume a wider variety of positions. In accordance with various aspects, the hose may be coupled to each attachment with a coupling that permits each hose section to rotate about the hose's central axis.

Figure 26:
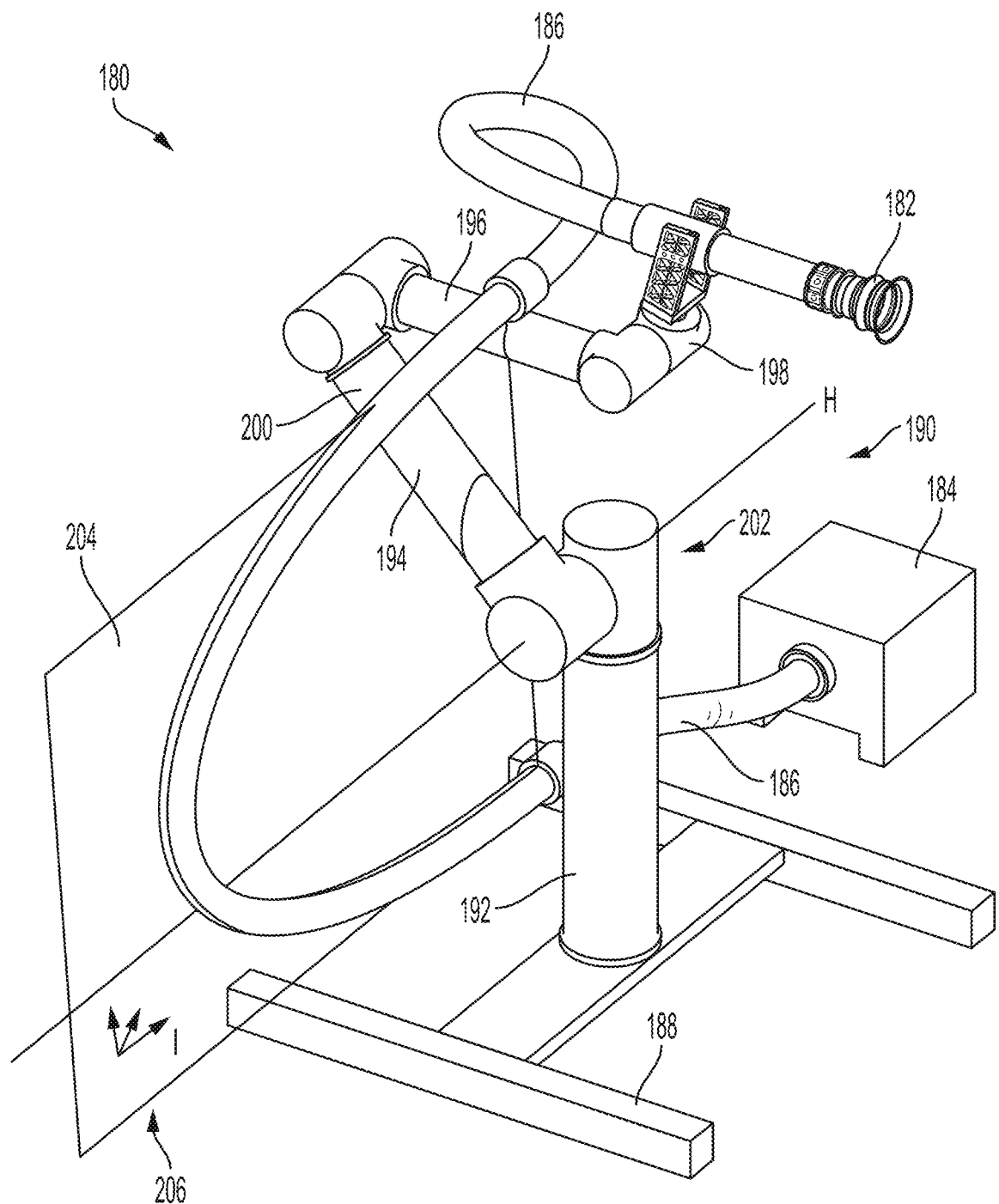
FIG. 26 shows an illustrative diagrammatic view of an articulated arm system in accordance a further aspect of the invention employing a routing scheme that includes a hose section that spans a plurality of arm sections and joints, showing a hose section plane I that is parallel with an axis of rotation H of a joint of the plurality of joints.

The system may also provide hose routing in accordance with aspects of the invention including hose attachments on non-adjacent arm sections. FIG. 26, for example, shows at 180 an articulated arm programmable motion robotic system that includes a vacuum end effector 182 that is coupled to a vacuum source 184 by a hose 186. The system includes a base 188 that supports an articulated arm 190 having arm sections 192, 194, 196 and 198. A section of the hose, hose section 200, is coupled to non-adjacent arm sections 192, 196 that share a joint 202 therebetween. The joint 202 may be rotated about an axis H. The joint portion of the hose 200 is mounted to define a plane 204 (e.g., through the center of the hose section 200), and such plane 204 is defined by having a plurality of directions as shown at 206. In accordance with an aspect, one of these directions (I as labelled) is parallel with the axis H.

Figure 27:
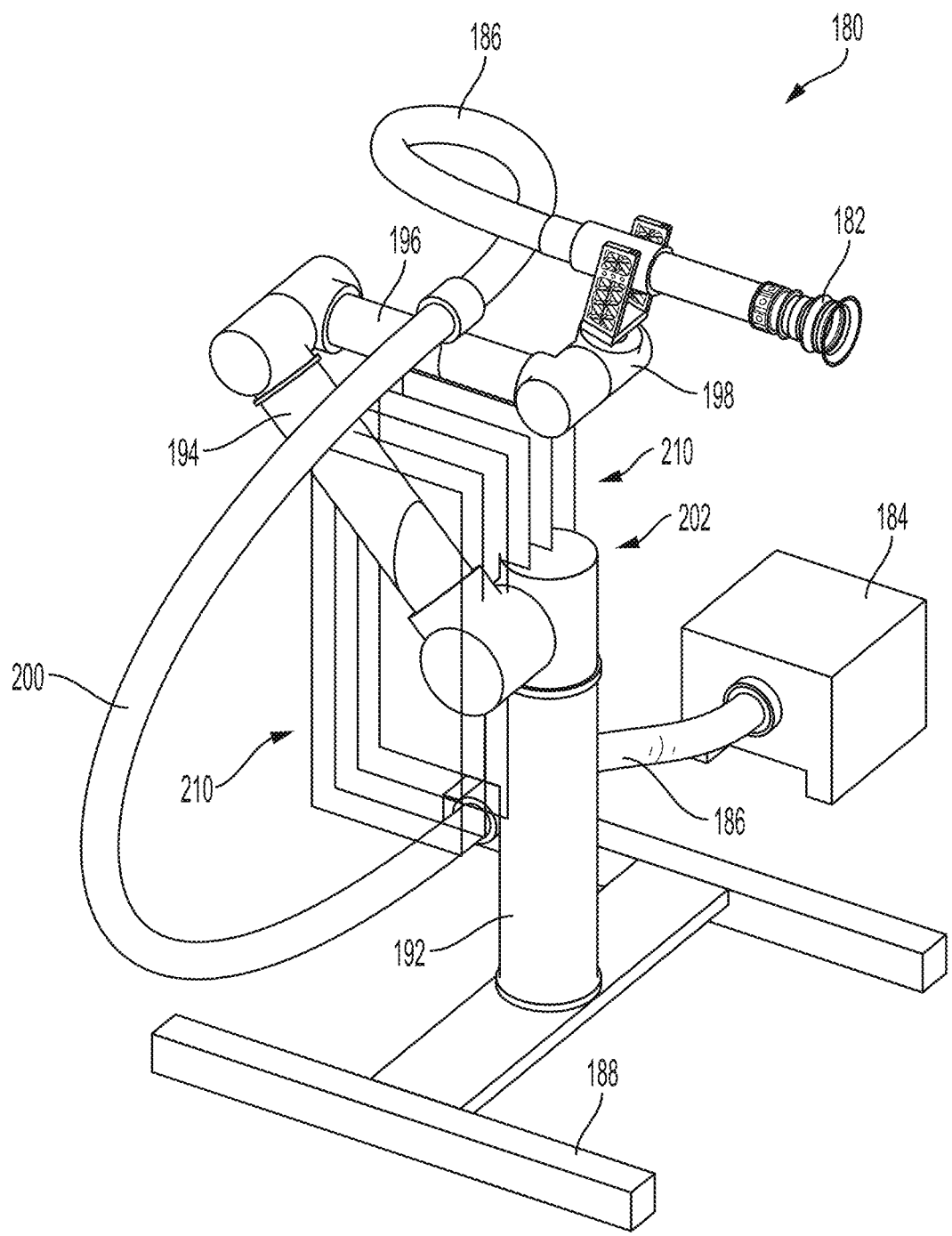
FIG. 27 shows an illustrative diagrammatic view of an articulated arm system of FIG. 26 employing the routing scheme that includes the hose section that spans the plurality of arm sections and joints, showing planes running perpendicular to the joint of the plurality of joints.

FIG. 27 shows the system 180 that includes the articulated arm programmable motion robotic system that includes the vacuum end effector 182 that is coupled to the vacuum source 184 by the hose 186. Again, the system includes the base 188 that supports the articulated arm 190 having arm sections 192, 194, 196 and 198. Similarly, the section of the hose 200 is coupled to non-adjacent arm sections 192, 196 that share the joint 202 therebetween. The joint 202 may be rotated about the axis H as discussed with respect to FIG. 26. During such rotation of the arm sections 194, 196 about the joint 202, the arm sections 192, 194 will define a plurality of planes as shown at 210. The plurality of planes 210 span the width of the joint 202. The joint portion of the hose 200 is mounted such that the joint portion of the hose 200 lies substantially outside of the plurality of planes 210.

Hose routing approaches of various embodiments of the invention allow for a chain of such kinds of attachments and hose segments to be provided that would exploit out-of-plane motions for a multi-link articulated arm programmable motion robotic system, with the objective of minimizing the maximum bending energy, and reducing the amount of cyclic loading to which the hose would be subjected.

Those skilled in the art will appreciate that modifications and variations may be made to the above disclosed embodiments without departing from the spirit and scope of the present invention.

What is claimed is:

1. A programmable motion robotic system comprising:
   a plurality of arm sections that are joined one to another at a plurality of joints to form an articulated arm; and
   a hose that couples an end effector of the programmable motion robotic system to a vacuum source,
   wherein the hose includes a plurality of joint portions, each joint portion of the hose being attached to two adjacent arm sections mutually attached to a respective joint such that the joint portion of the hose remains substantially outside of any plane defined by motion of the mutually adjacent arm sections when rotated about the joint, and wherein the hose extends across the plurality of arm sections at each attachment point such that the plurality of joint portions of the hose alternate on opposite sides of the plurality of joints and a tangent to the hose at each attachment point of the plurality of joint portions of the hose is substantially perpendicular to any plane defined by the motion of the mutually adjacent arm sections when rotated about the joint.

2. The programmable motion robotic system as claimed in claim 1, wherein the vacuum source provides, via the hose, a vacuum at the end effector having a flow rate of at least 100 cubic feet per minute.

3. The programmable motion robotic system as claimed in claim 1, wherein the vacuum source provides, via the hose, a vacuum at the end effector having a vacuum pressure of no more than 50,000 Pascals below atmospheric.

4. The programmable motion robotic system as claimed in claim 1, wherein the hose has an inner diameter of at least 1 inch.

5. The programmable motion robotic system as claimed in claim 1, wherein the hose has an inner diameter of at least 3 inches.

6. The programmable motion robotic system as claimed in claim 1, wherein the hose has a helical ribbing.

7. The programmable motion robotic system as claimed in claim 1, wherein the hose includes at least three joint portions of the hose, each of the at least three joint portions of the hose is attached to at least two adjacent arm sections mutually attached to a respective joint such that the at least three joint portions of the hose each remain substantially outside of any plane defined by motion of the mutually adjacent arm sections when rotated about the respective joint, and wherein a tangent to the hose at each attachment point of the at least three joint portions of the hose is substantially perpendicular to any plane defined by the motion of the mutually adjacent arm sections when rotated about the joint.

8. The programmable motion robotic system as claimed in claim 1, wherein the hose includes no portion of the hose that is attached to at least two adjacent arm sections mutually attached to a respective joint such that the joint portions of the hose each remain substantially inside of any plane defined by motion of the mutually adjacent arm sections when rotated about the respective joint.

9. The programmable motion robotic system as claimed in claim 1, wherein the end effector includes a flexible bellows.

10. A programmable motion robotic system comprising:
a plurality of arm sections that are joined one to another at a plurality of joints to form an articulated arm; and
a hose that couples an end effector of the programmable motion robotic system to a vacuum source,
wherein the hose includes a plurality of joint portions, each joint portion of the hose being attached to two adjacent arm sections mutually attached to a respective joint such that each joint portion of the hose defines a plane that includes a respective direction that is generally parallel with an axis of rotation of the respective joint, and wherein the hose extends substantially perpendicular across the plurality of arm sections at each attachment point such that the plurality of joint portions of the hose alternate on opposite sides of the plurality of joints.

11. The programmable motion robotic system as claimed in claim 10, wherein the vacuum source provides, via the hose, a vacuum at the end effector having a flow rate of at least 100 cubic feet per minute.

12. The programmable motion robotic system as claimed in claim 10, wherein the vacuum source provides, via the hose, a vacuum at the end effector having a vacuum pressure of no more than 50,000 Pascals below atmospheric.

13. The programmable motion robotic system as claimed in claim 10, wherein the hose has an inner diameter of at least 1 inch.

14. The programmable motion robotic system as claimed in claim 10, wherein the hose has an inner diameter of at least 3 inches.

15. The programmable motion robotic system as claimed in claim 10, wherein the hose has a helical ribbing.

16. The programmable motion robotic system as claimed in claim 10, wherein the hose includes at least three joint portions of the hose, each of the at least three joint portions of the hose is attached to at least two adjacent arm sections mutually attached to a respective joint such that the at least three joint portions of the hose each defines a plane that includes a respective direction that is generally parallel with an axis of rotation of the respective joint, and wherein the hose extends substantially perpendicular across a respective arm section at each attachment point of the at least three joint portions of the hose.

17. The programmable motion robotic system as claimed in claim 10, wherein the hose includes no portion of the hose that is attached to at least two adjacent arm sections mutually attached to a respective joint such that the joint portions of the hose each defines a plane that includes a respective direction that is generally not parallel with an axis of rotation of the respective joint.

18. The programmable motion robotic system as claimed in claim 10, wherein the end effector includes a flexible bellows.

19. A programmable motion robotic system comprising:
a plurality of arm sections that are joined one to another at a plurality of joints to form an articulated arm; and
a hose that couples an end effector of the programmable motion robotic system to a vacuum source,
wherein the hose includes a plurality of joint portions, each joint portion of the hose being attached to two adjacent arm sections mutually attached to a respective joint such that each joint portion of the hose defines a plane that includes a respective direction that is generally parallel with an axis of rotation of the respective joint, and
wherein the hose extends across the plurality of arm sections at each attachment point such that the plurality of joint portions of the hose alternate on opposite sides of the plurality of joints and a tangent to the hose at each attachment point of the plurality of joint portions of the hose is substantially parallel with the axis of rotation of the joint.

20. The programmable motion robotic system as claimed in claim 19, wherein the vacuum source provides, via the hose, a vacuum at the end effector having a flow rate of at least 100 cubic feet per minute.

21. The programmable motion robotic system as claimed in claim 19, wherein the vacuum source provides, via the hose, a vacuum at the end effector having a vacuum pressure of no more than 50,000 Pascals below atmospheric.

22. The programmable motion robotic system as claimed in claim 19, wherein the hose has an inner diameter of at least 1 inch.

23. The programmable motion robotic system as claimed in claim 19, wherein the hose has an inner diameter of at least 3 inches.

24. The programmable motion robotic system as claimed in claim 19, wherein the hose has a helical ribbing.

25. The programmable motion robotic system as claimed in claim 19, wherein the hose includes at least three joint portions of the hose, each of the at least three joint portions of the hose being attached to at least two adjacent arm sections mutually attached to a respective joint such that the joint portions of the hose defines a plane that includes a respective direction that is generally parallel with an axis of rotation of the respective joint, and wherein a tangent to the hose at each attachment point of the at least three joint portions of the hose is substantially parallel with the axis of rotation of the respective joint.

26. The programmable motion robotic system as claimed in claim 19, wherein the hose includes no portion of the hose that is attached to at least two adjacent arm sections mutually attached to a respective joint such that the joint portions of the hose defines a plane that includes a respective direction that is generally not parallel with an axis of rotation of the respective joint.

27. The programmable motion robotic system as claimed in claim 19, wherein the end effector includes a flexible bellows.

\* \* \* \* \*